US008539769B2

(12) United States Patent
Hansen et al.

(10) Patent No.: US 8,539,769 B2
(45) Date of Patent: *Sep. 24, 2013

(54) INTERNAL COMBUSTION ENGINE AND SUPERCHARGER

(76) Inventors: Craig N. Hansen, Plymouth, MN (US); Paul C. Cross, Shorewood, MN (US)

( * ) Notice: Subject to any disclaimer, the term of this patent is extended or adjusted under 35 U.S.C. 154(b) by 233 days.

This patent is subject to a terminal disclaimer.

(21) Appl. No.: 12/807,148

(22) Filed: Aug. 27, 2010

(65) Prior Publication Data

US 2011/0083647 A1    Apr. 14, 2011

Related U.S. Application Data

(63) Continuation-in-part of application No. 12/587,800, filed on Oct. 14, 2009.

(51) Int. Cl.
*F02B 33/44* (2006.01)
*F02B 33/00* (2006.01)
*F01C 1/16* (2006.01)
*F04C 18/00* (2006.01)
*F04C 2/00* (2006.01)

(52) U.S. Cl.
USPC ........ 60/611; 123/559.1; 123/564; 418/201.2

(58) Field of Classification Search
USPC ................... 123/559.1, 564; 418/201.2, 120; 60/611
See application file for complete search history.

(56) References Cited

U.S. PATENT DOCUMENTS

| 30,157 | A | | 9/1860 | Roots |
|---|---|---|---|---|
| 2,067,984 | A | * | 1/1937 | Ross ............................. 123/564 |
| 2,164,451 | A | * | 7/1939 | Fast ............................. 123/564 |
| 2,201,014 | A | | 5/1940 | Sheerer |
| 2,283,694 | A | * | 5/1942 | Perrine ......................... 123/564 |
| 2,519,991 | A | | 8/1950 | Lysholm |
| 2,578,196 | A | | 12/1951 | Montelius |
| 3,088,658 | A | | 5/1963 | Wagenius |
| 3,088,659 | A | * | 5/1963 | Nilsson et al. ............. 418/201.2 |
| 3,151,806 | A | | 10/1964 | Whitfield |

(Continued)

FOREIGN PATENT DOCUMENTS

| DE | 3721522 A1 * | 2/1988 |
|---|---|---|
| JP | 58030414 A * | 2/1983 |

(Continued)

OTHER PUBLICATIONS

A certified English Translation of Shin Narasaka, et al. (Pub. No. JP 61-223234 A), published on Oct. 3, 1986.*

Primary Examiner — Thai Ba Trieu
(74) Attorney, Agent, or Firm — Richard John Bartz

(57) ABSTRACT

An internal combustion engine drivably connected to a variable displacement and variable internal compression ratio supercharger that supplies varying amounts of air to the engine air intake manifold that can range selectively from below through above atmospheric pressures responsive to the power requirements of the engine. The supercharger has a pair of rotors concurrently driven by the engine to move air to the engine. A slide assembly associated with screw rotors is movable with a controller relative to the rotors to bypass air to atmosphere and regulate the amount of air and pressure of the air above atmospheric pressure compressed by the screw rotors to the engine to increase the engine's efficiency. When operating at part-load unboosted, a throttle valve is operable to control the air mass flowing to the air intake manifold below atmospheric pressure to control the power of the engine.

50 Claims, 26 Drawing Sheets

(56) References Cited

U.S. PATENT DOCUMENTS

| | | | | |
|---|---|---|---|---|
| 3,303,348 A | | 2/1967 | Cox et al. | |
| 3,673,796 A | | 7/1972 | Weick et al. | |
| 3,874,828 A | * | 4/1975 | Herschler et al. | 418/201.2 |
| 3,933,137 A | | 1/1976 | Uno et al. | |
| 4,042,310 A | * | 8/1977 | Schibbye et al. | 418/201.2 |
| 4,227,372 A | * | 10/1980 | Kakimoto et al. | 60/602 |
| 4,453,900 A | | 6/1984 | Schibbye et al. | |
| 4,455,131 A | * | 6/1984 | Werner-Larsen | 418/201.2 |
| 4,508,089 A | | 4/1985 | Baumgartner et al. | |
| 4,575,323 A | * | 3/1986 | Yoshimura | 418/201.2 |
| 4,597,726 A | | 7/1986 | Soderlund et al. | |
| 4,609,329 A | * | 9/1986 | Pillis et al. | 418/201.2 |
| 4,633,844 A | * | 1/1987 | Okimoto | 123/564 |
| 4,802,457 A | | 2/1989 | Oscarsson | |
| 4,870,822 A | * | 10/1989 | Kamimaru | 60/611 |
| 4,873,961 A | * | 10/1989 | Tanaka | 123/564 |
| 4,964,790 A | * | 10/1990 | Scott | 418/201.2 |
| 4,991,562 A | | 2/1991 | Chujo | |
| 4,995,347 A | | 2/1991 | Tate | |
| 5,108,269 A | | 4/1992 | Glanvall | |
| 5,115,788 A | | 5/1992 | Sasaki et al. | |
| 5,127,386 A | | 7/1992 | Sowards | |
| 5,137,003 A | * | 8/1992 | Kyoya et al. | 123/564 |
| 5,186,081 A | | 2/1993 | Richardson et al. | |
| 5,190,016 A | * | 3/1993 | Takeda | 123/564 |
| 5,203,309 A | | 4/1993 | Goto et al. | |
| 5,203,683 A | | 4/1993 | Yoshikawa et al. | |
| 5,207,206 A | | 5/1993 | Takahashi et al. | |
| 5,228,368 A | | 7/1993 | Kato et al. | |
| 5,269,667 A | | 12/1993 | Mauney | |
| 5,347,972 A | | 9/1994 | Sandou et al. | |
| 5,411,387 A | * | 5/1995 | Lundin et al. | 418/201.2 |
| 5,730,586 A | * | 3/1998 | Sayama | 123/564 |
| 5,791,315 A | | 8/1998 | Riach et al. | |
| 5,979,168 A | | 11/1999 | Beekman | |
| 6,022,203 A | | 2/2000 | Kirsten | |
| 6,401,012 B1 | | 6/2002 | Aoki et al. | |
| 6,604,514 B1 | | 8/2003 | Englund et al. | |
| 6,695,591 B2 | | 2/2004 | Grimmer et al. | |
| 6,883,324 B2 | * | 4/2005 | Igarashi et al. | 123/564 |
| 6,901,324 B2 | | 5/2005 | Rose et al. | |
| 6,931,850 B2 | | 8/2005 | Frank et al. | |
| 6,990,814 B2 | * | 1/2006 | Boley et al. | 60/611 |
| 7,076,954 B1 | | 7/2006 | Sopko et al. | |
| 7,100,584 B1 | * | 9/2006 | Bruestle et al. | 60/611 |
| 7,137,253 B2 | | 11/2006 | Furman | |
| 7,174,714 B2 | | 2/2007 | Algrain | |
| 7,201,569 B2 | * | 4/2007 | Hossner | 418/201.2 |
| 7,644,585 B2 | | 1/2010 | Haugen | |
| 7,654,086 B2 | * | 2/2010 | Gong et al. | 60/611 |
| 7,726,285 B2 | | 6/2010 | Hansen et al. | |
| 7,748,437 B2 | | 7/2010 | Rohellec | |
| 7,752,840 B2 | | 7/2010 | Stewart | |
| 7,814,752 B2 | * | 10/2010 | Hu | 60/611 |
| 7,966,815 B2 | * | 6/2011 | Kipping et al. | 60/611 |
| 2002/0116925 A1 | | 8/2002 | Hampson et al. | |
| 2006/0042246 A1 | | 3/2006 | Gray, Jr. et al. | |
| 2008/0051976 A1 | | 2/2008 | Kimoto et al. | |
| 2009/0228187 A1 | | 9/2009 | Nakamura | |

FOREIGN PATENT DOCUMENTS

| | | | |
|---|---|---|---|
| JP | 58030415 A | * | 2/1983 |
| JP | 61218731 A | * | 9/1986 |
| JP | 61223234 A | * | 10/1986 |

* cited by examiner

INTERNAL COMBUSTION ENGINE AND SUPERCHARGER

CROSS REFERENCE TO RELATED APPLICATION

This application is a continuation-in-part of U.S. application Ser. No. 12/587,800 filed Oct. 14, 2009.

FIELD OF THE INVENTION

The technology of the invention relates to internal combustion engines equipped with superchargers for supplying air to engines with intake manifolds that can range selectively from below through above atmospheric pressure conditions according to the requirements of the engines to increase efficiency and performance of the engines.

BACKGROUND OF THE INVENTION

Air displacement devices are used to increase the supply of air and fuel to internal combustion engines to boost engine horsepower. An example of an air displacement device is the "Roots blower" shown by P. H. Roots in U.S. Pat. No. 30,157 and G. Scheerer in U.S. Pat. No. 2,201,014. Each of these devices has a belt-driven shaft that drives two close-clearance rotors. The rotating rotors during each rotation sweep out a specific volume of air to an air receiver, such as an internal combustion engine. The rotational speed of the rotors largely determines the unthrottled volume of air discharged by the device to an air receiver.

C. N. Hansen and P. C. Cross in U.S. Pat. No. 6,241,498 disclose a supercharger having cooperating rotors drivably connected to an internal combustion engine for delivering an air/fuel mixture to the combustion chamber of the engine. The rotors have semi-cylindrical pockets and protrusions that continuously move air through the supercharger. The unthrottled volume of air delivered by the supercharger depends on the operating speed of the engine that drives the supercharger. The unthrottled volume of air delivered by the supercharger operating at a constant speed varies little. There are no air flow controls to regulate air flowing into and out of the supercharger.

J. E. Whitfield in U.S. Pat. No. 3,151,806 discloses a screw type compressor having a pair of rotors rotatably mounted on a housing. Volume control valves are located on the fluid inlet side of a fixed valve spacer. Compression control valves located on the fluid outlet side of the fixed valve spacer regulate the size and length of the fluid discharge outlet. Screws connected to the valves are used to adjust the positions of the valves to provide desired variations in fluid delivery volume and internal compression ratio.

F. Soderlund and K. Karlsson in U.S. Pat. No. 4,597,726 disclose a screw compressor having two rotors rotatably mounted on a housing for mutual meshing engagement. The pressure ratio and the capacity of the compressor is regulated with two slides mounted for independent axial movements. One slide regulates the capacity of the compressor. The other slide regulates the built-in volume ratio of the compressor.

N. Tsuboi in U.S. Pat. No. 4,951,638 discloses a screw type supercharger having a pair of female and male rotors. Gears mounted on one end of each rotor synchronize rotation of the rotors so that they do not contact each other. One rotor is connected to an internal combustion engine which provides input power to the supercharger. The supercharger does not include intake air flow controls that regulate the volume of air delivered to an internal combustion engine intake manifold.

J. Oscarsson in U.S. Pat. No. 4,802,457 discloses an internal combustion engine equipped with a supercharger having rotors located in compression chambers. An air throttle device associated with the air inlet side of the supercharger is operated by the foot accelerator when the engine is only partially loaded to restrict the air flow into the rotor chamber.

A. B. Riach in U.S. Pat. No. 5,791,315 discloses a spark ignition internal combustion engine coupled to a supercharger having an air inlet port control for controlling the intake air into the supercharger. The control includes an inlet port valve which is open at full engine load and progressively closes when the engine load is progressively reduced and an air flow throttle valve which is open at full engine load and progressively closes when the load is progressively reduced.

G. Kirsten in U.S. Pat. No. 6,022,203 discloses a variable displacement screw-type compressor having a pair of rotors operable to move fluid under compression from an inlet channel to an outlet channel. Housing segments associated with the rotors control the internal compression ratio of the compressor. Control cams rotated with a stepper motor displace the housing segments against the bias of springs.

Four stroke engines do not require blowers or superchargers to supply air for starting and continuous operation. In a four stroke naturally aspirated or unboosted engine, the first down stroke of the piston draws air below atmospheric pressure into the cylinder. The air in the cylinder is compressed on the upstroke below the ignition temperature of the fuel. Fuel may be mixed with air prior to its induction into the cylinders or may be sprayed into the cylinders during the intake or compression strokes of the pistons. Near the top of the stroke of the pistons the air-fuel mixture is ignited by an electric arc generated by spark plugs. The elevated pressure of the trapped gas due to the rapid burning of the fuel moves the pistons down during the working stroke. The subsequent upstroke of the pistons drives the exhaust gases and particulates out of the cylinders through exhaust valves to an exhaust manifold. The output torque of four stroke engines is controlled by varying the air mass and proportional fuel mass burned in each cylinder.

SUMMARY OF THE INVENTION

The invention comprises an internal combustion engine having an air intake manifold accommodating air that can range selectively from below through above atmospheric pressure operably connected to a load, such as a motor vehicle drive system, pump or an electric generator, combined with a variable internal compression ratio and variable displacement supercharger for supplying varying amounts of air efficiently to the engine. Examples of this internal combustion engine are typically spark ignited gasoline, compressed natural gas, and hydrogen fueled engines and some spark-assisted engines. These engines generally operate with throttled intake manifolds below atmospheric pressure for maintaining a desired air/fuel ratio during some part-load operating conditions, and are hereinafter referred to as air density controlled or throttled engines. In a first operation or case the intake manifold of the engine is below atmospheric pressure. In this case the supercharger has its variable displacement mechanism set generally equal to the engine cycle displacement, and a throttle mechanism varies the manifold vacuum to control the engine power output. In this case the supercharger is not increasing the engine intake manifold pressure, and normal part-load throttling losses of the engine are unaffected by the supercharger. In a second operation or case the supercharger varies its displacement to provide more than the engine cycle displacement, and the throttle mechanism is wide open and is no longer controlling the engine power output. In this case the supercharger is increasing the engine intake manifold pressure and associated engine power output as demanded. The net result of these two cases is the most efficient operation of the engine from no boost through varying levels of boost. The supercharger is a positive air displacement device or gas compressor powered by the engine to improve the power to weight ratio of the engine. Other power devices, such as electric motors, can operate the air displacement device. The gas compressor is operable to move air at or above atmospheric pressure selectively, a first portion of the air to a first location and a second portion of the air to a second location. The supercharger has an air flow control that regulates the volume and pressure of air compressed by the supercharger to the engine to control the power of the engine when driving variable loads more efficiently than a naturally aspirated larger displacement engine of the same peak power capacity. The supercharger operates to increase the flow of the air to the cylinders of the engine responsive to the power requirements of the engine, improving the engine's overall efficiency. Air is moved through the supercharger with a pair of rotating screws or rotors or one female and one male rotor having cooperating helical grooves and protrusions or lands that create positive air flow to the engine. The twin rotors are a durable part of or component of a compact and efficient air compressor that delivers air to the engine to achieve the performance required. The volume of air flow delivered by the supercharger is regulated by controlling the effective air trapping length of the twin rotors. One or more slide assemblies associated with the rotors control the air moving and compressing operation of the supercharger. The air flow control is a movable slide assembly in one embodiment of the supercharger comprising an elongated slide or bypass member movably positioned adjacent to one side of a rotor to regulate the amount of air trapped by the rotating rotors and to direct excess uncompressed air back to atmosphere thereby cooling the rotors and adjacent housing and increasing the pumping efficiency of the supercharger. An actuator connected to the member functions to move the member between maximum air bypass, partial air bypass and minimum air bypass positions relative to the rotors. When the member is in the maximum air bypass position, the throttle valve controls the density of the air in the engine intake manifold according to the speed and load requirements of the engine. When additional power is desired, the volume and pressure of air supplied to the engine by the supercharger is changed by progressively moving the member between maximum air bypass, partial air bypass and minimum air bypass positions. An actuator positions the bypass member to control the air mass or volume of air supplied to the engine when the throttle is wide open according to the speed and load requirements of the engine. A processor responsive to signals representing the speed and load on the engine generates command signals that coordinate the actuator and a module that regulates the amount of fuel injected into the engine's cylinders. A manually operated control device can be used to provide operator power demand inputs to the processor or to directly operate the actuator to control the operating position of the slide member. An air mass flow sensor responsive to the flow of air directed by the supercharger to the engine provides additional input to the processor to control the operation of the supercharger and introduction of fuel to the engine's combustion cylinders. The variable compression ratio and variable displacement supercharger produces the lowest parasitic losses to the system by minimizing the compression work required of the supercharger to meet the current power requirements of the engine. The supercharger operates to use intake air to remove heat generated by the supercharger, bypassing uncompressed cooling excess air to atmosphere. The bypassed air need not recirculate back to the air intake of the supercharger. In this case, the uncompressed excess air discharged to atmosphere results in internal cooling of the supercharger components and lowers the air temperature of compressed air delivered to the engine. The implications of these cooling effects include smaller intercoolers, lower engine air intake charge temperature, reduced air pressure for a given air mass flow rate, and variable air flow for emissions control schemes.

The invention includes the method of supplying power to a power user, such as motor vehicles, pumps, and electric generators. An engine is drivably connected to the power user which imparts a load on the engine. An air supply from a supercharger is directed to the engine that can range selectively from below through above atmospheric pressure in varying amounts responsive to the power requirements of the engine. The rate of flow of air to the engine is varied selectively from below through above the naturally aspirated rate of flow of air to the engine. An amount of fuel is introduced in the air in the intake manifold or in the combustion chamber at the proper time to meet the power or load requirements of the engine and can be controlled to provide proper combustion and emissions performance. The supercharger is operable to expel a first portion of the volume of uncompressed air generated by the supercharger to atmosphere, and direct a second portion of the volume of air generated by the supercharger to the engine. The first portion of air, expelled to atmosphere, is controlled to selectively vary the volume or rate of flow of the second portion of the air directed to the engine. The first portion of air cools the rotors and housing as the air transfers heat generated by the previous compression of air by the rotors. This reduces the temperatures of the second portion of air directed to the engine.

An object of the invention is to improve the power to weight ratio of internal combustion engines. Another object of the invention is to combine a supercharger and a four stroke internal combustion engine to improve the engine's portability and reduce its size and weight for a given maximum power rating. A further object of the invention is to combine an internal combustion engine and a positive displacement air supercharger having the ability to efficiently adjust boost air pressure and air mass flow to the engine over the engine operating range to increase the fuel efficiency of the engine and/or alter the engine exhaust emissions.

DESCRIPTION OF THE INVENTION

Figure 1:
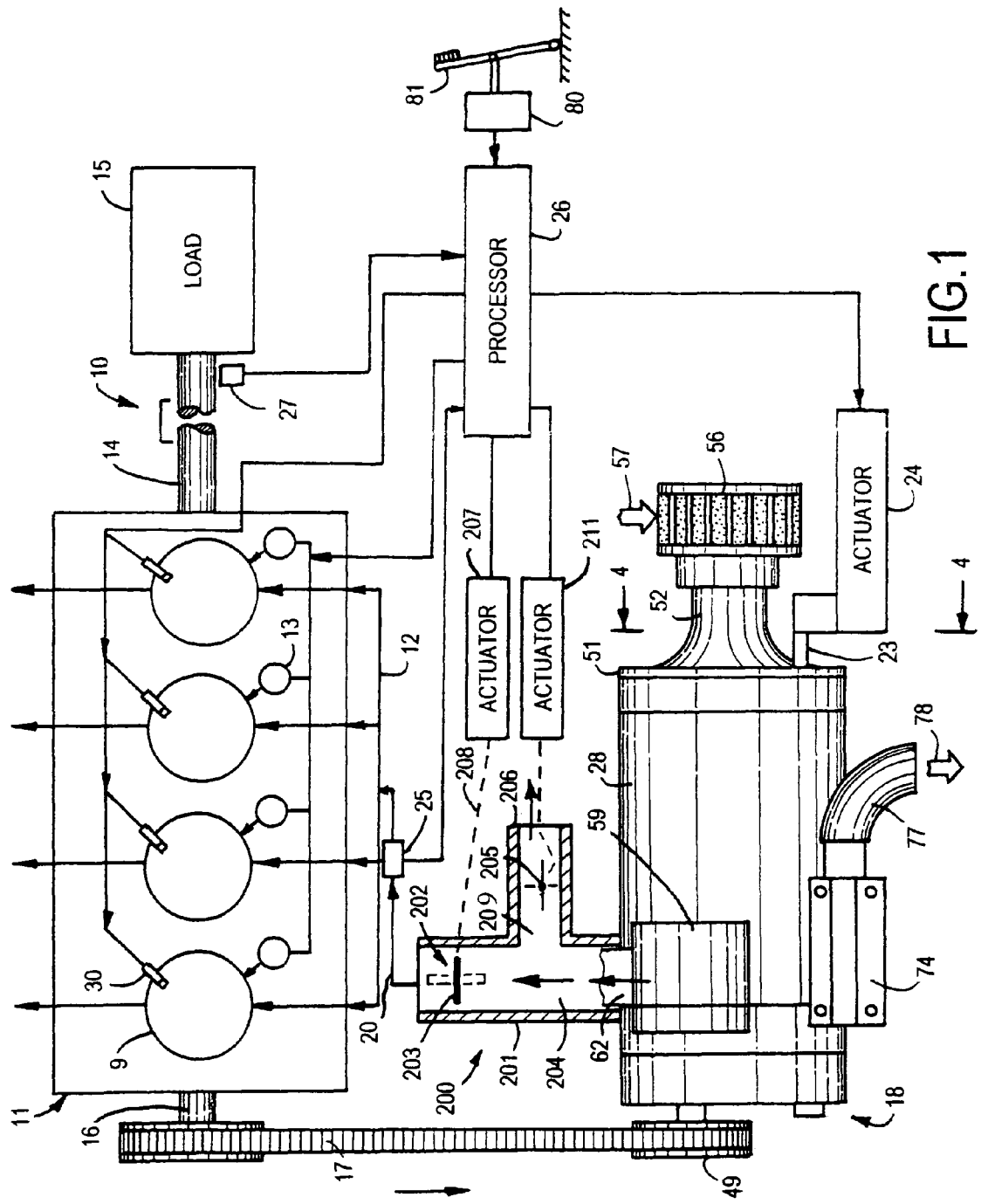
FIG. 1 is a diagram of a first embodiment of an internal combustion engine coupled to a load and the supercharger of the invention.
Figure 7:
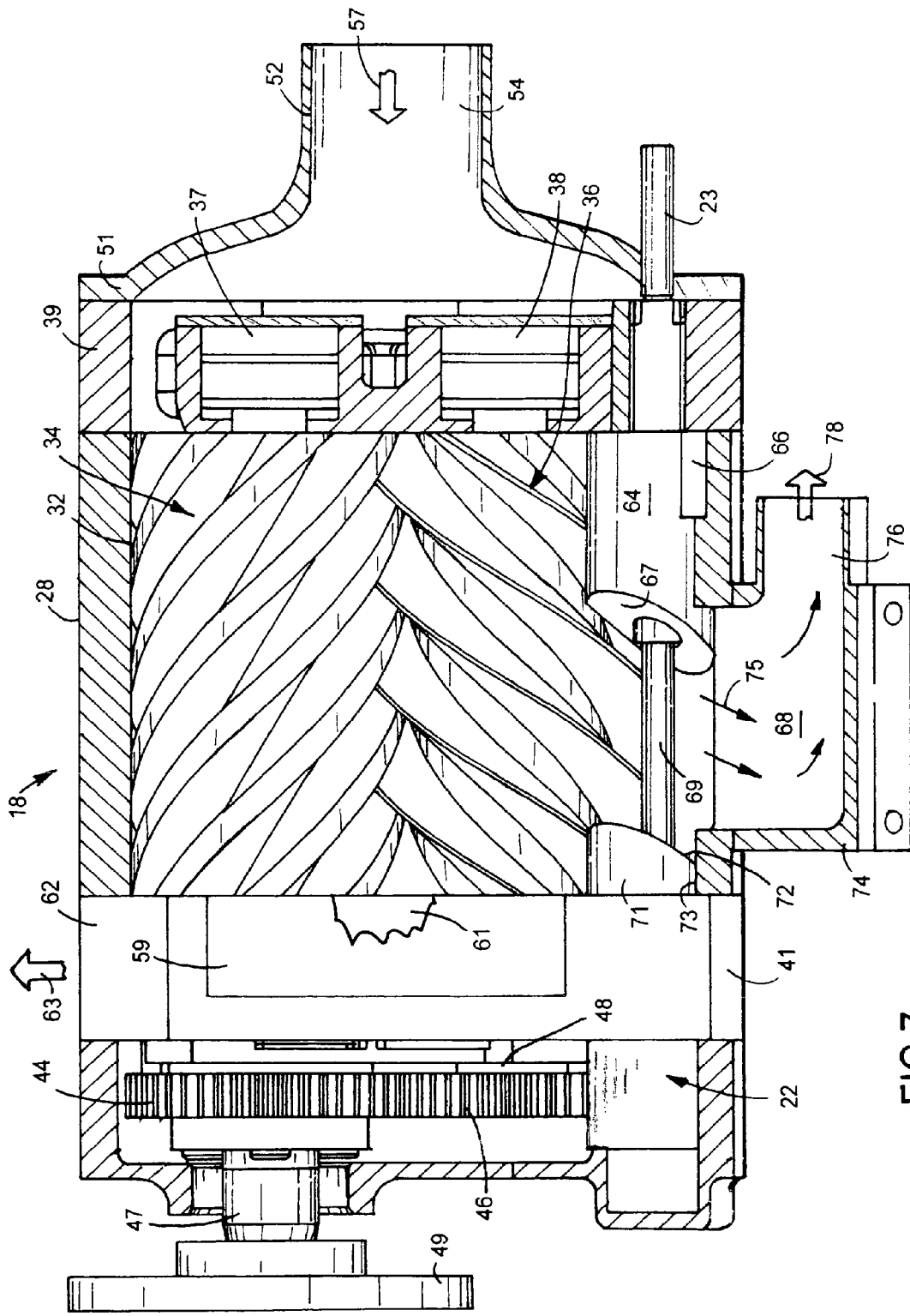
FIG. 7 is a sectional view taken along line 7-7 of FIG. 6 showing the air control slide assembly in a maximum air bypass position for allowing a minimum volume of air to be delivered from the supercharger to the engine.
Figure 8:
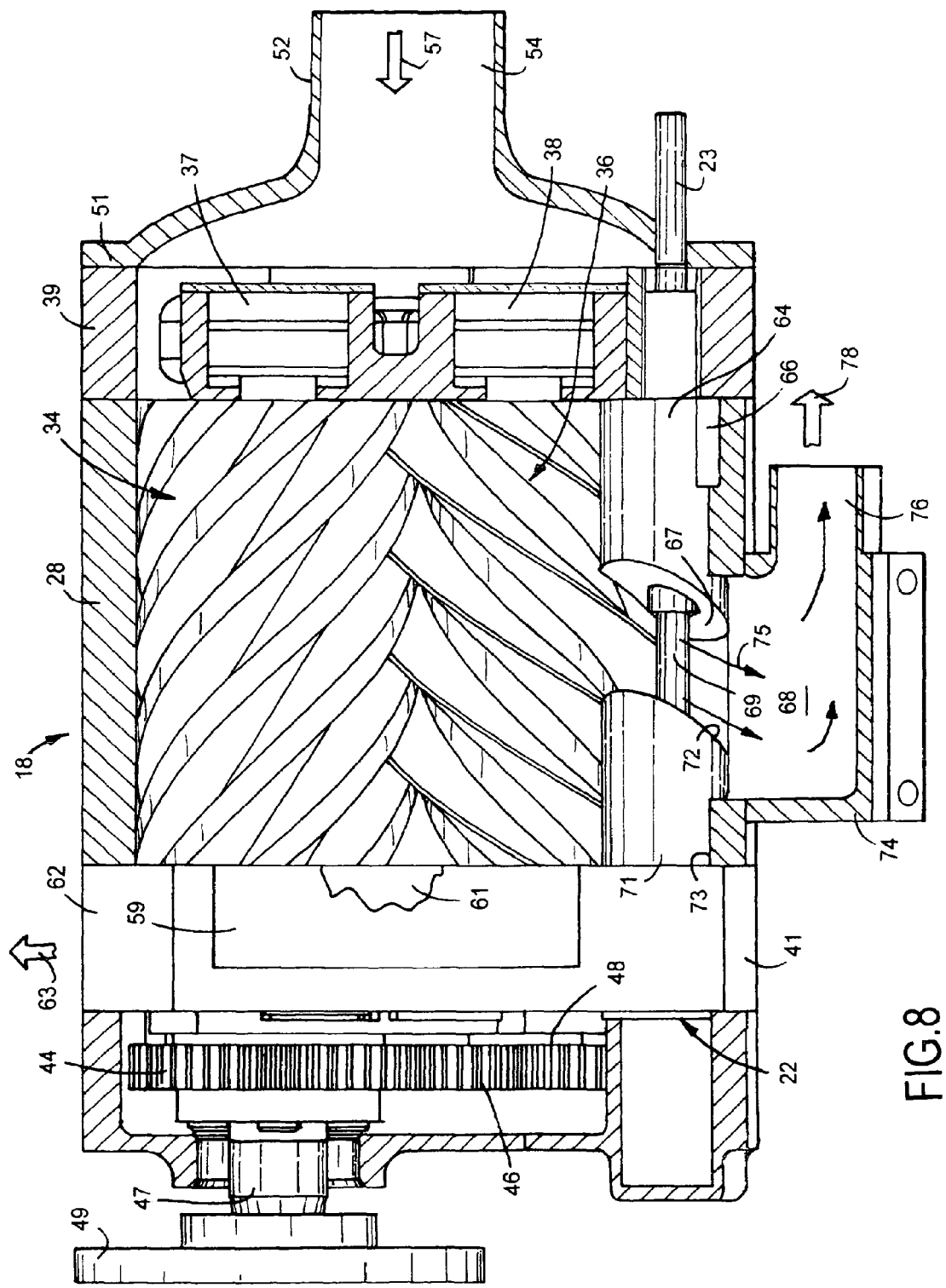
FIG. 8 is a sectional view the same as FIG. 7 showing the air control slide assembly in a partial air bypass position for allowing a selected volume of air to be delivered from the supercharger to the engine.
Figure 9:
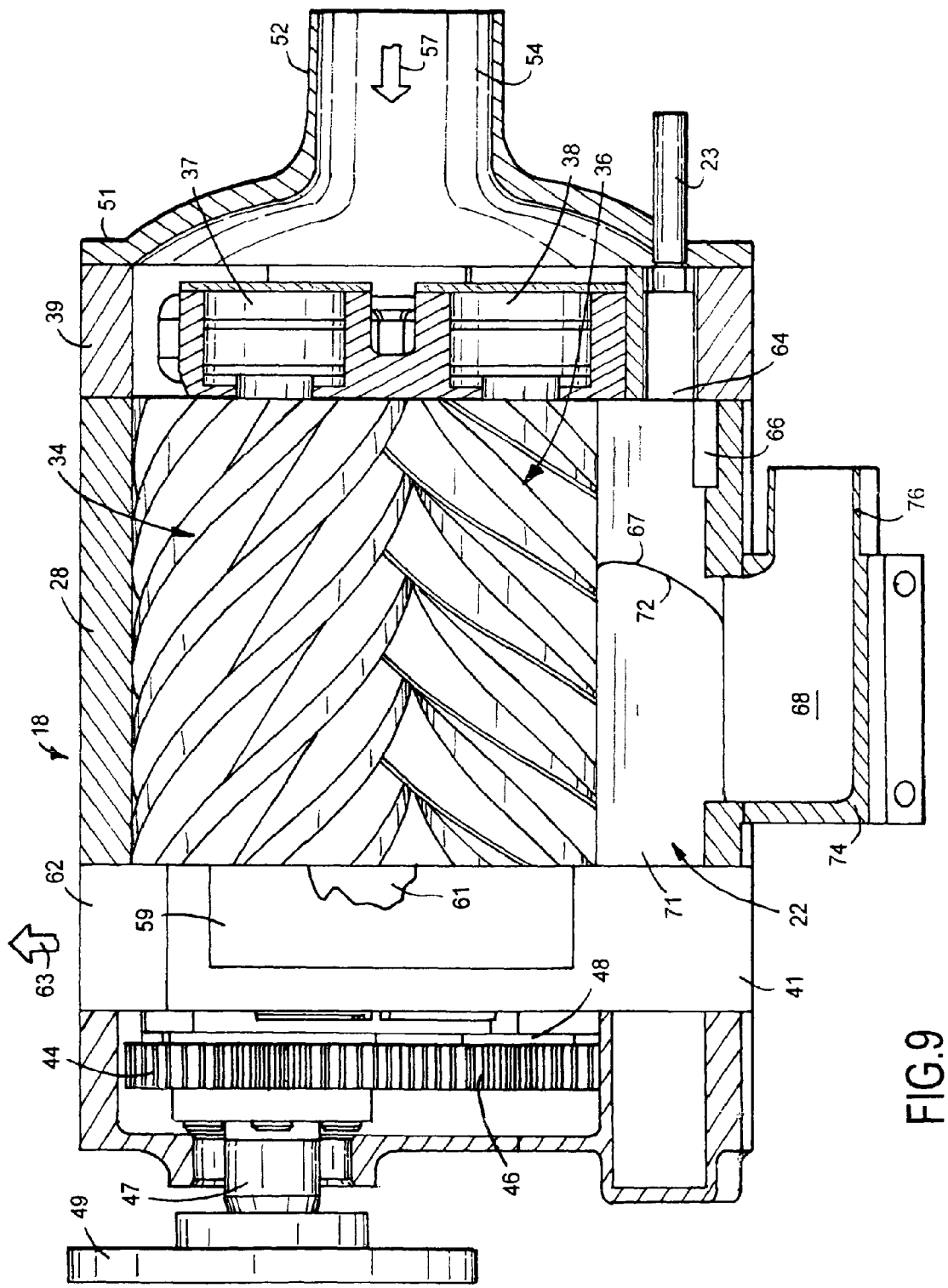
FIG. 9 is a sectional view the same as FIG. 7 showing the air control slide assembly in a minimum air bypass position for allowing a maximum volume of air to be delivered from the supercharger to the engine.

The supercharged internal combustion power unit 10, shown in FIG. 1, is an internal combustion engine 11 having combustion cylinders 9, an engine air intake manifold 12 with a plenum passage to convey air to cylinder 9. A drive shaft 14 is operably connected to a load 15. Engine 11 is a conventional internal combustion engine, with fuel injectors 13 operable to timely introduce fuel into the engine's combustion chambers. Fuel injectors may be located in the plenum passage of the air intake manifold adjacent the cylinders. A spark igniter 30, such as a conventional spark plug, is associated with each cylinder 9 to initiate ignition of the air-fuel mixture in cylinder 9. Each spark igniter 30 is wired to an electronic signal processor 26 operable to cause igniter 30 to generate an electric arc that ignites the air-fuel mixture in each cylinder at the proper time. Engine 11 includes engines that operate below atmospheric air pressure and near or above atmospheric air pressure in the engine's air intake manifold 12. Load 15 can be a motor vehicle drive system, a pump, an electric generator or machines drivably coupled to drive shaft 14. A front drive shaft 16 of engine 11 couples a belt and pulley power transmission 17 to a supercharger 18 operable to compress and direct air into manifold 12. Transmission 17 can alternatively be a chain and sprocket or a gear drive. Other types of devices, such as electric motors, can be used to operate supercharger 18. An air mass flow sensor 25 coupled to tube 20 provides electric signals to processor 26 corresponding to the air conditions within intake manifold 12. Other methods and devices to determine or infer air mass flow rate utilizing such inputs sensors as manifold air temperature, manifold air pressure, throttle position, and engine speed may be used alternatively. As shown in FIGS. 7, 8, and 9, supercharger 18 includes an air flow control slide assembly 22 made up of axially fixed shaft 23 threaded into translatable bypass slide 71 and passing through fixed member 64. Rotation of shaft 23 by rotary actuator 24 causes translation of bypass slide 71. In an alternative configuration, shaft 23 can translate axially with bypass slide 71 for positioning if actuator 24 is a linear actuator. Rotary movement of shaft 23 is operable to control maximum air bypass, partial air bypass and minimum air bypass positions of bypass slide 71 of slide assembly 22 which regulates air flow 78 bypassed to atmosphere through passage 68, and the supply of air delivered to intake manifold 12 of engine 11. An actuator 24, such as a rotary servomotor or linear actuator, coupled to shaft 23 operates actuator shaft 23 to move axially the bypass slide 71 of slide assembly 22 between open, intermediate, and closed positions, herein referred to as maximum air bypass, partial air bypass, and minimum air bypass positions, to vary the volume of air bypassed to atmosphere and the remainder directed by supercharger 18 to the combustion chamber of engine 11, effectively varying the displacement of supercharger 18 responsive to the operating requirements of engine 11 while the engine intake manifold 12 is at or above atmospheric air pressure. Control processor or microprocessor 26 is wired to actuator 24, air mass flow sensor 25, a speed sensor 27 and spark igniters. An operator control device 80 coupled to foot pedal 81 is used to provide processor 26 with operator demand electric signals responsive to actuation of foot pedal 81 by the operator of engine 11. Foot pedal 81 is manually moved to operate control device 80 to generate electric signals for processor 26 to increase or decrease the power output of engine 11. Other types of controls can be used to operate control device 80. Processor 26 receives power demand signals from the operator via control device 80. If the engine is operating at low power levels when more power is demanded, processor 26 instructs actuator 207 to further open throttle plate 203. If more power is demanded than can be produced when throttle plate 203 reaches the fully open position, then processor 26 instructs actuator 211 to close valve member 205. The initial maximum air bypass position of bypass slide 71 provides no boost to engine 11 until movement of bypass slide 71 increases displacement of supercharger 18. Actuator 24 progressively moves shaft 23 and bypass slide 71 causing increased amounts of air to flow to the engine intake manifold 12. Conversely, reduced power demands would reverse the sequence. Concurrently, processor 26 is adjusting standard engine control parameters such as fuel flow rates, ignition timing, and vehicular transmission gear selection for engine speed in response to inputs from exhaust conditions, mass airflow rates, and other engine operating conditions to achieve optimal fuel economy and emissions.

Supercharger 18 has an air control apparatus 200 operable to regulate the air mass flow delivered by supercharger 18 to engine 11 during operation of engine 11 selectively from below through above atmospheric pressure conditions in the engine intake manifold 12. Air control apparatus 200, shown in FIG. 1, includes a tubular member or T-coupling 201 connected to air output temple 59 of supercharger housing 28 for transporting air out of supercharger 18 to engine air intake manifold 12. A first valve assembly 202 located in passage 204 of coupling 201 is pivotally mounted on coupling 201 for progressive movement between fully open and closed positions to control the air mass flowing to intake manifold 12.

Valving assembly 202 includes a generally flat or plate-like throttling member or disk 203 configured to rotate approximately ninety degrees from its nearly closed position, shown in full lines substantially perpendicular to the air stream to restrict the flow of air through passage 204, to partly open positions, and to fully open position shown in broken lines, to the air stream in passage 204. When the throttling member 203 is in the fully open position, there is nearly unrestricted flow of air in passage 204. An actuator 207 connected with a linkage 208 to valving member 203 adjusts the position of valving member 203 to regulate the flow of air into manifold 12 to regulate the manifold pressure and associated power output of engine 11 during below atmospheric pressure conditions within manifold 12. When valving member 203 is fully open, as shown in broken lines, supercharger 18 can be operated to boost the air mass directed to engine 11 whereby the engine operates at above atmospheric pressure in manifold 12. T-coupling 201 has lateral tube 206 and a second passage 209 open to passage 204 of coupling 201. A second valve assembly 205 has a generally flat or plate-like member or disk pivoted for movement between open and closed positions relative to passage 209. Actuator 211 is wired to processor 26 that regulates the operation of valve member 205 along with supercharger 18 and engine 11. When valve member 205 is in the closed position, shown by broken lines, passage 204 is open and passage 209 is closed. During operation of engine 11 at above atmospheric pressure conditions valving member 203 is open allowing maximum flow of air out of supercharger 18 and valving member 205 closes passage 209 directing air from supercharger 18 to passage 204 and manifold 12. An actuator 211 connected with a linkage to valving member 205 adjusts the position of valving member 205 in conjunction with the open position of valving member 203. Actuator 211 is wired to processor 26 that regulates the operation of actuator 24 along with supercharger 18, actuator 207 and engine 11. Valving member 205 is in its fully open position when intake manifold 12 of engine 11 is operating below atmospheric pressure, and in its fully closed position when intake manifold 12 of engine 11 is operating at or above atmospheric pressure.

Figure 1A:
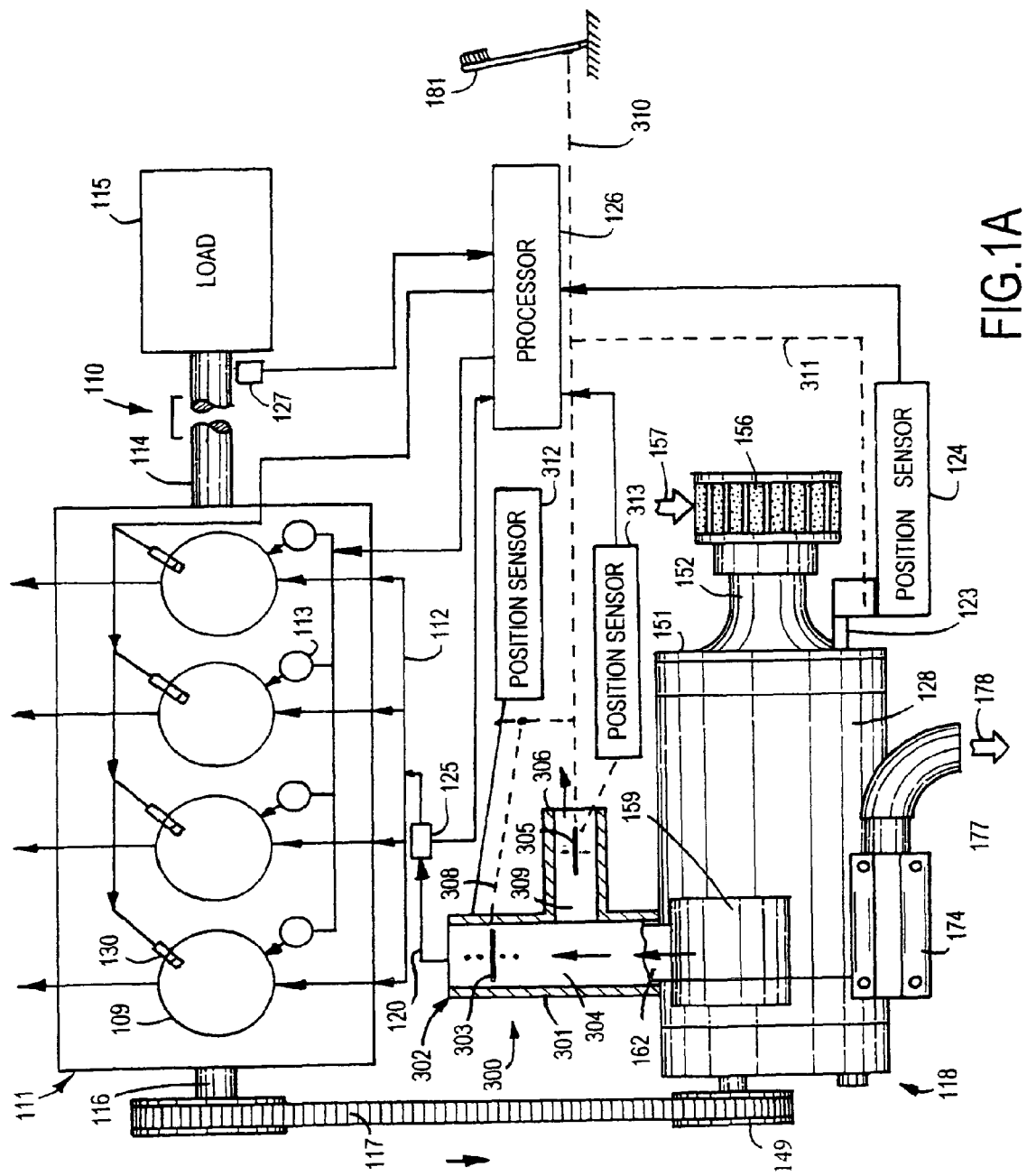
FIG. 1A is a second embodiment of an internal combustion engine coupled to a load and supercharger of the invention.

A second embodiment of the supercharged internal combustion power unit 110, shown in FIG. 1A, includes conventional internal combustion engine 111 having a drive shaft 114 connected to a load 115, such as an electric generator, water pump, or vehicle drive system. A supercharger 118 driven by engine 111 is controlled with a processor 126 and actuator 124 operable to operate engine 111 during power changes of the load. Engine 111 can operate at varying speeds to accommodate a load, such as an electric generator. The parts of supercharger 118 that correspond to the parts of supercharger 18 have the same reference numbers with the prefix 1. The engine control system of the second modification shown in FIG. 1A employs a progressive sequential mechanical linkage without electronically controlled actuators. In sequence of increasing power levels, the progressive sequential mechanical linkage first opens throttle plate 303 progressively until fully open, then moves valve member 305 from fully open to fully closed, and then moves shaft 123 from its maximum air bypass position progressively to its minimum air bypass position. Sensors 312 and 313 report the positions of valve members 303 and 305, and sensor 124 reports the position of shaft 123 to processor 126 to assist transient operation of the engine. Additional sensors such as measured mass flow rates are also reported to processor 126 in order to provide engine control parameters including fuel flow rates, ignition timing, and transmission gear selection for engine speed, fuel economy optimization, and exhaust emissions control.

Figure 21:
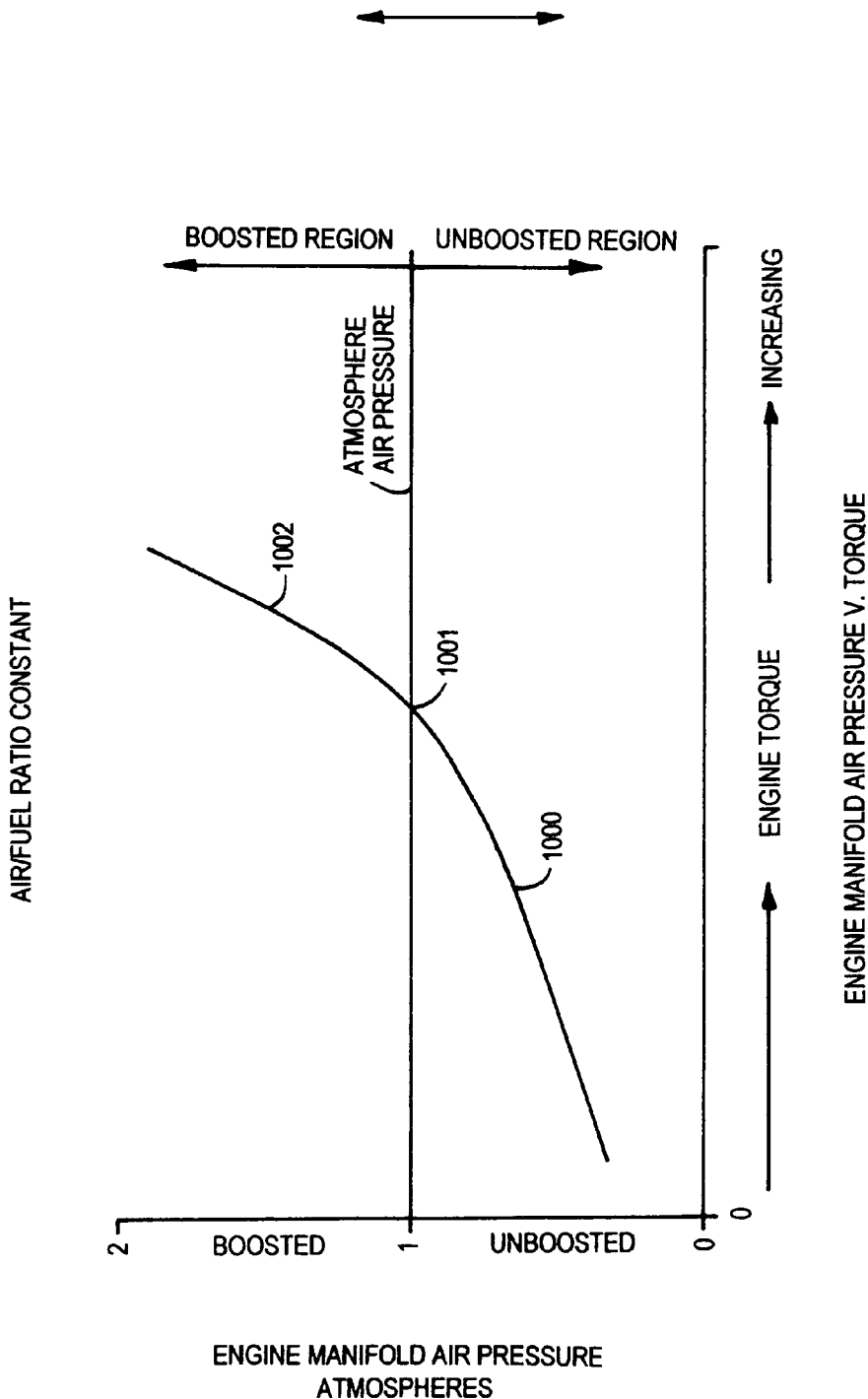
FIG. 21 is a diagram of unboosted and boosted engine intake manifold air pressures and torque output of the internal combustion engine coupled to the supercharger of the invention.

Supercharger 118, shown in FIG. 1A, has an air control apparatus 300 operable to selectively regulate the flow of air to internal combustion engine manifold 112 that can range selectively from below through above atmospheric pressure to accommodate the power requirement of the engine 111. As shown in FIG. 21, under constant air/fuel ratio conditions the torque output at any speed of internal combustion engine 111 increases with engine intake manifold pressure as shown in the unboosted region 1000 below atmospheric pressure 1001, and further increases in the boosted region 1002 above atmospheric pressure 1001. Tube 301 has a passage 304 for directing the flow of air from supercharger 118 to intake manifold 112. A variable throttle valve assembly 302 pivotally mounted on tube 301 is operable to progressively throttle or check the flow of air to manifold 112 to control the power of engine 111 operating below atmospheric pressure conditions. Throttle valve assembly 302 has a generally flat valve member 303. When valve 303 is in the open position, shown in broken lines, and valve member 305 is closed, shown in broken lines, the intake manifold 112 of engine 111 can operate boosted or above atmospheric pressure conditions. The operating position of valve member 303 is regulated with a first linkage 308 to valve member 303. Linkage 308 connects to operator control 181 with a progressive sequential linkage 310. A tube 306 having a passage 309 joined to a side of tube 301 accommodates a valve member 305 that controls the flow of air out of passage 309 to atmosphere. A progressive sequential linkage 310 operatively connects valve member 305 that operates to move valve 305 between an open position, shown in full lines, and a closed position, shown in broken lines. When valve member 303 is open, shown in broken lines, valve member 305 is closed to allow substantially all the engine-directed air from supercharger 118 to flow through passage 304 to manifold 112 of engine 111. Linkage 311 connects to operator control 181 with progressive sequential linkage 310. Control shaft 123 is positioned by progressive sequential linkage 311 to meet the air and associated power requirements of engine 111. Supercharger 118 can then operate to increase or boost the air mass flow to manifold 112 and boost the pressure of the air in manifold 112 above atmospheric pressure. Supercharger 118 is operable to vary the mass of air flow and pressure of the air in manifold 112 and engine cylinders to meet the power requirement of the engine. Throttle valve member 303 and valve member 305 and control rod 123 are mechanically connected with progressive sequential linkages 308, 310, and 311 to foot pedal 181. Foot pedal 181 operates to move linkages 308 and 310 to turn valve members 303 and 305 between their open and closed positions independently of processor 126. Processor 126 controls the injection of fuel into the cylinders and ignition of the air fuel mixture in the cylinders based upon inputs from sensors such as mass airflow, engine speed, exhaust oxygen, manifold pressure, and valve position sensors. When engine 111 is operating at idle speed, valve member 303 is in a substantially closed position limiting the flow of air to intake manifold 112. The air flow to engine 111 is increased by moving foot pedal 181 forward whereby linkage 310 turns valve member 303 toward its open position and then linkage 308 closes valve 305, and linkage 311 moves rod 123 rod 123 to further increase the air mass flow to engine 111. This increases the flow of air from supercharger 118 to air intake manifold 112 which in turn increases the associated power of engine 111. Increasing the engine speed will further increase the air mass flow and associated power of engine 111. Air flow control 300 can also be provided with one or more actuators (not shown) coupled to processor 126 operable to control the operation of valve members 303 and 305 and rod 123 in conjunction with mechanical linkages 308, 310, and 311 for redundancy.

Figure 2:
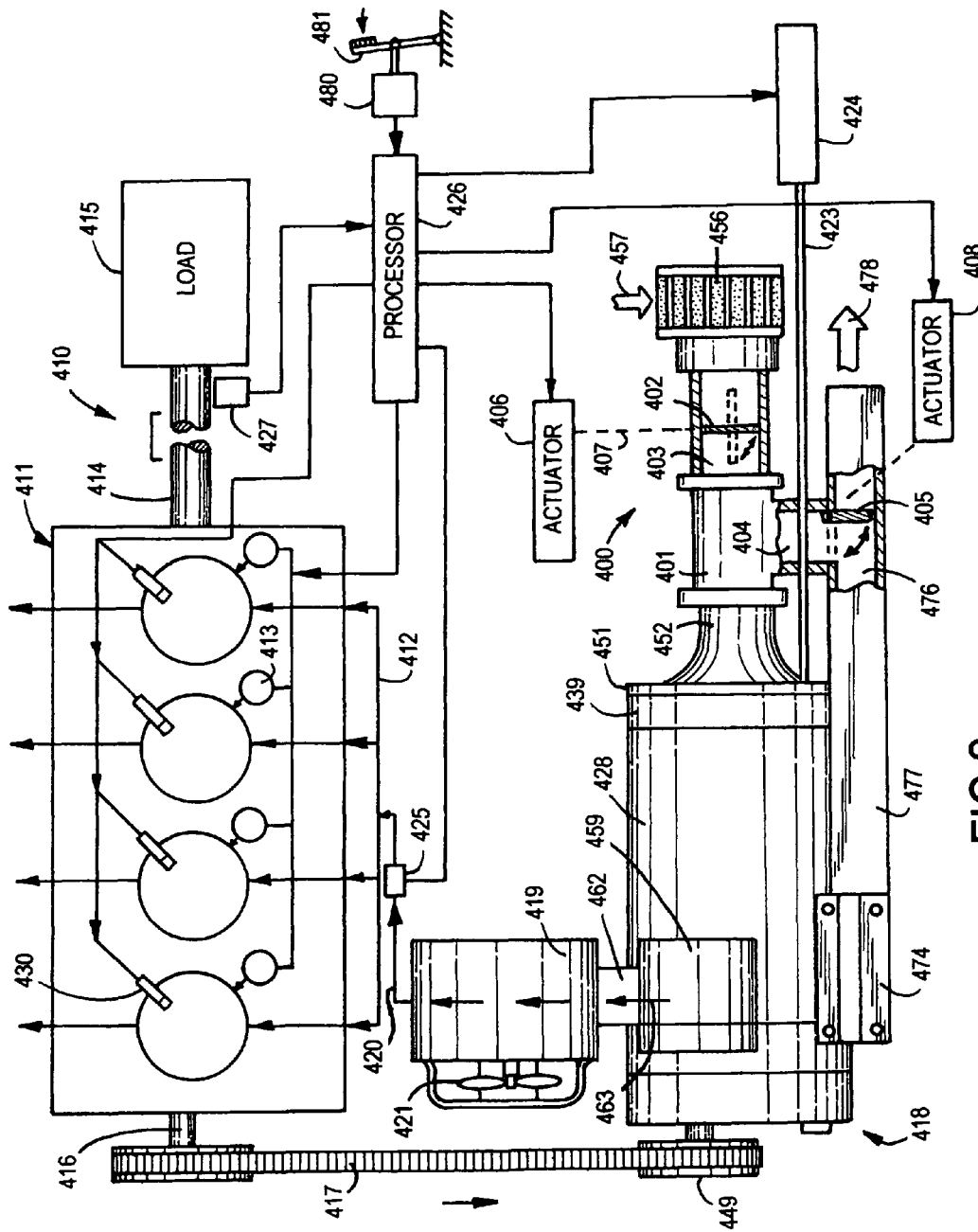
FIG. 2 is a diagram of a third embodiment of an internal combustion engine coupled to a load and the supercharger of the invention.

A third embodiment of the supercharged internal combustion power unit 410 is shown in FIG. 2. The parts of the power unit 410 that correspond to power unit 110 have the same reference numbers with the prefix 4 in lieu of prefix 1 and are incorporated herein. Supercharger 418 can operate to compress and direct air into an air cooler or heat exchanger 419 connected with a tube 420 to intake manifold 412 of the engine 411. Vehicle motion or a motor driven fan 421 directs atmospheric air through air cooler 419 whereby heat is conducted from the air from supercharger 418 as it flows through air cooler 419. An air control apparatus 400 is operable to regulate air mass flow delivered by supercharger 418 to the engine intake manifold 412 that can range selectively from below through above atmospheric conditions. Air control apparatus 400 includes a tubular member or T-coupling 401 connected between air inlet end 452 and air filter 456 of supercharger 418 for transporting air into supercharger 418. A throttle valve assembly 402 located within passage 403 is pivotally mounted on tubular housing 401 for movement between fully open and nearly closed positions to regulate the air mass flowing into supercharger 418. Tubular housing 401 has a side passage 404 open to supercharger bypass air passage 476. A second valve member 405 pivotally mounted on housing 477 is moveable to direct flow from passage 476 into passage 404 whereby bypass air flows from supercharger 418 back to passage 403. When valve member 402 is in the open position, as shown in broken lines, there is nearly unrestricted flow of air through passage 403 and into supercharger 418. Supercharger 418 can then be operated to boost the air mass directed to the engine. An actuator 406 wired to processor 426 is connected with a linkage 407 to valving member 402 to regulate the flow of air into supercharger 418 to control the power of the engine during below atmospheric pressure conditions within manifold 412. Valving member 405 is operably connected to an actuator 408 with a linkage 409. Actuator 408 wired to processor 426 directs command signals to actuator 408 which operates to move valve member 405 to either its open or closed positions. Valve member 405 is also moveable to direct bypass flow from supercharger 418 through passage 476 to atmosphere shown as air flow 478. When valve member 405 is in this position, shown in broken lines, and valve 402 is fully open, also shown in broken lines, the control of boost level in the engine manifold 412 is provided by actuator 424 and control rod 423. Mechanical linkages may be used to control the airflow in lieu of actuators, as described in the second embodiment of the supercharger described herein.

Figure 2A:
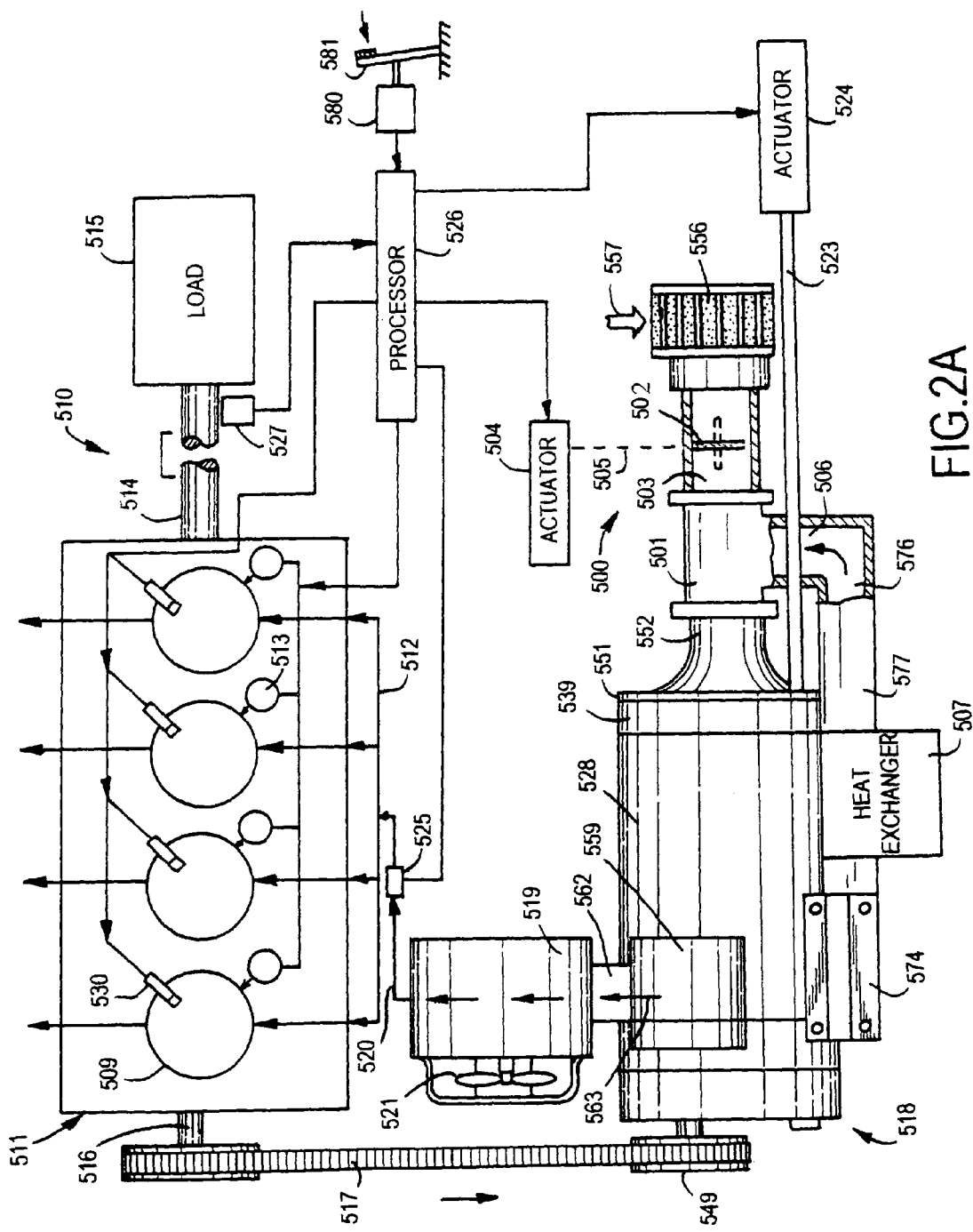
FIG. 2A is a diagram of a fourth embodiment of an internal combustion engine coupled to a load and supercharger of the invention.

A fourth embodiment of the supercharged internal combustion power unit 510 is shown in FIG. 2A. The parts of power unit 510 that correspond to the parts of power units 10 and 410 have the same reference numbers with a prefix 5 and are incorporated herein. An air control apparatus 500 interposed between supercharger 518 air inlet 552 and air filter 556 controls the air mass flow of air into supercharger 518. Air control apparatus 500 includes a tubular member or T-coupling 501 having an air passage 503 for accommodating air flowing into supercharger 518. A throttle valve member 502 located in passage 503 is pivotally mounted on tubular member 501 for movement between a nearly closed position, shown in full lines, and an open position, shown in broken lines to control the air mass flowing into supercharger 518. An actuator 504 wired to processor 526 and connected to valve member 502 with linkage 505 controls the open and nearly closed positions of valve member 502. Actuator 504 is responsive to command signals generated by processor 526 responsive to the position of foot pedal 581 or other engine control devices. Tubular housing 501 has a side passage 506 open to passage 503 and supercharger bypass air passage 576. Tube 577 is connected to tubular housing 501 whereby the bypass air flowing in passage 576 flows back to the air inlet passage 503 and to supercharger 518. An air cooler or heat exchanger 507 interposed in tube 577 cools the bypass air flowing in passage 576 back to air intake passage 503 and supercharger 518. Bypass air from supercharger 518 may flow through passage 576 to air intake passage 503 without an air cooler if desired. Valve member 502 is moveable to throttle the flow into supercharger 518. When valve member 502 is in the fully open position, shown in broken lines, the control of boost level in the engine manifold 512 is provided by actuator 524 and control rod 523. Mechanical linkages may be used to control the airflow in lieu of actuators, as described in the second embodiment of the supercharger described herein.

Figure 6:
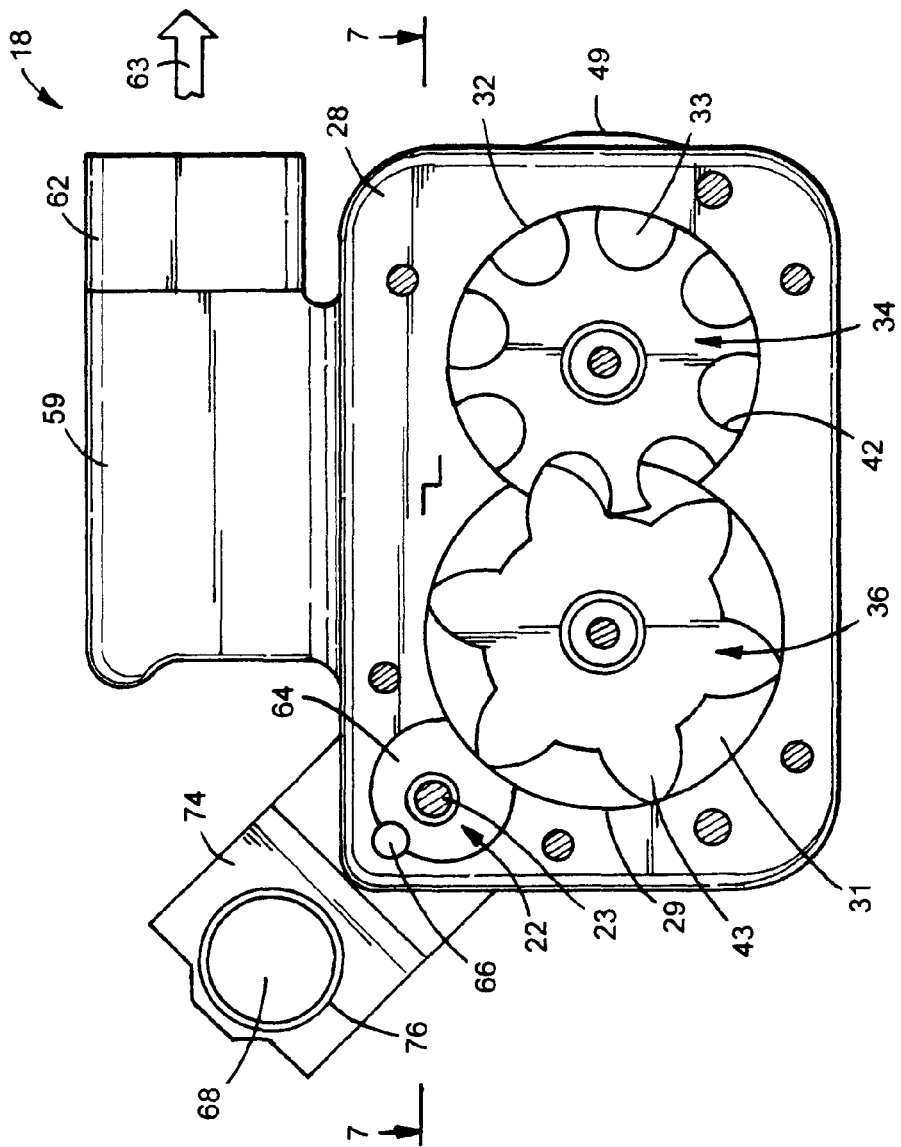
FIG. 6 is an enlarged sectional view taken along line 6-6 of FIG. 3.

Supercharger 18, shown in FIGS. 6 and 7, has a housing 28 with a first cylindrical wall 29 surrounding a first cylindrical chamber or bore 31 and a second cylindrical wall 32 surrounding a second cylindrical chamber or bore 33. Chambers 31 and 33 have parallel axes and intersecting adjacent arcuate sections. A female screw or rotor 34 is located along the length of chamber 33. A male screw or rotor 36 is located along the length of chamber 31. Bearings 37 and 38, shown in FIGS. 4, 7 to 9, and 11, support rotors 34 and 36 on end members 39 and 41. Rotor 34 has eight circumferentially spaced helical grooves 42 which mesh with male rotor 36. As shown in FIG. 6, rotor 36 has a number of helical protrusions, vanes or lands 43 projected in radial outward directions from the minor diameter of rotor 36. Each land has convex shaped side walls that are complementary to the shapes of the walls of grooves 42. The sizes, numbers, shapes, helical configuration and extent of grooves 42 and lands 43 can vary. As shown in FIG. 6, rotor 36 has six helical lands 43 which cooperate with the eight helical grooves 42 in rotor 34 to compress and move air in chambers 31 and 33. Other groove and land numbers and sizes can be incorporated into cooperating rotors 34 and 36. Returning to FIGS. 7, 8 and 9, synchronizing gears 44 and 46 connected to rotor shafts 47 and 48 concurrently rotate rotors 34 and 36 in opposite circular directions. Shaft 47 is attached to a pulley or sprocket wheel 49 accommodating the endless belt of power transmission 17 drivably coupling an engine to supercharger 18 whereby rotors 34 and 36 are rotated in opposite circular directions at speeds related to the rotational speed of the engine's drive shaft 16.

Figure 3:
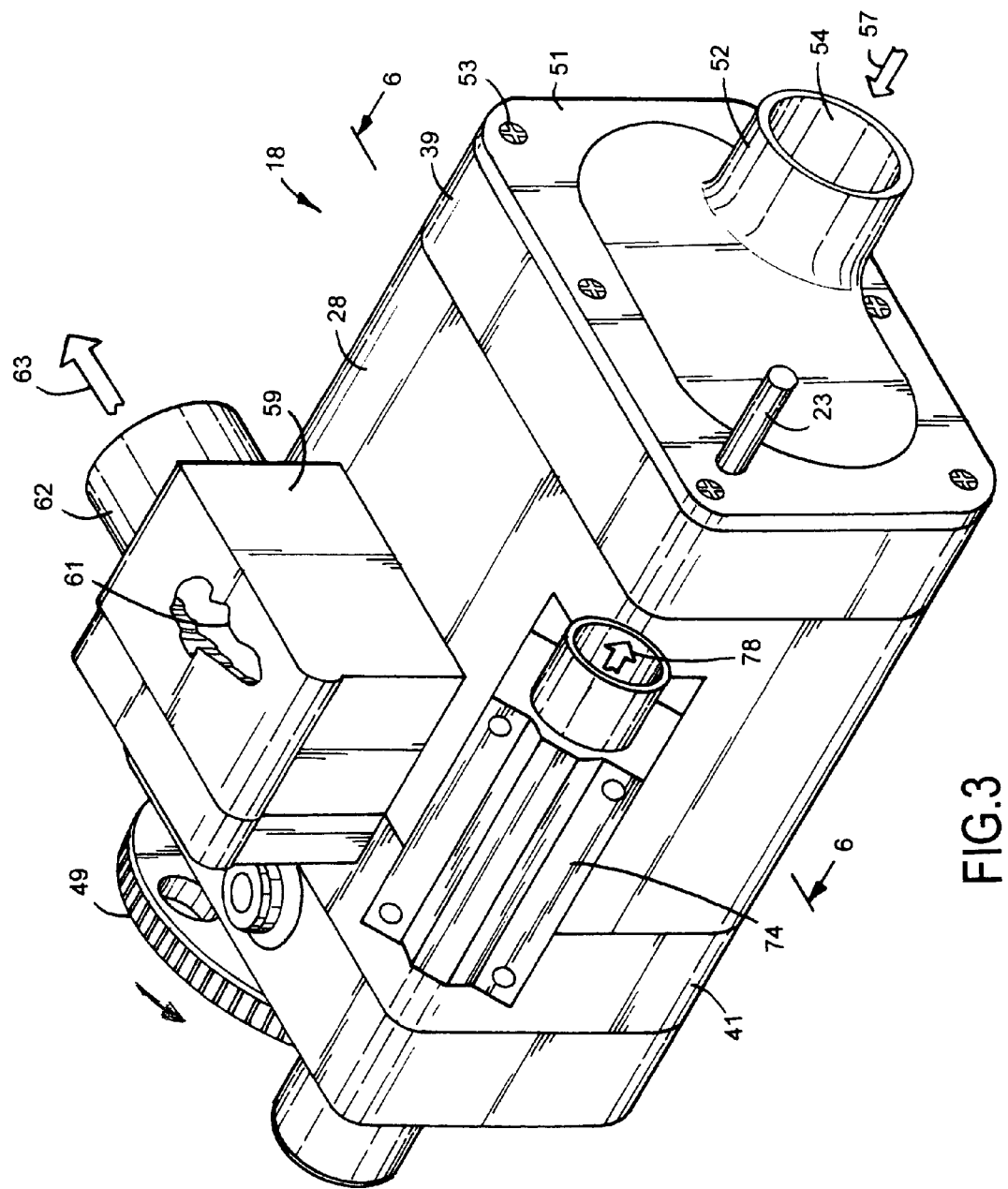
FIG. 3 is an enlarged perspective view of the supercharger in FIG. 1.
Figure 4:
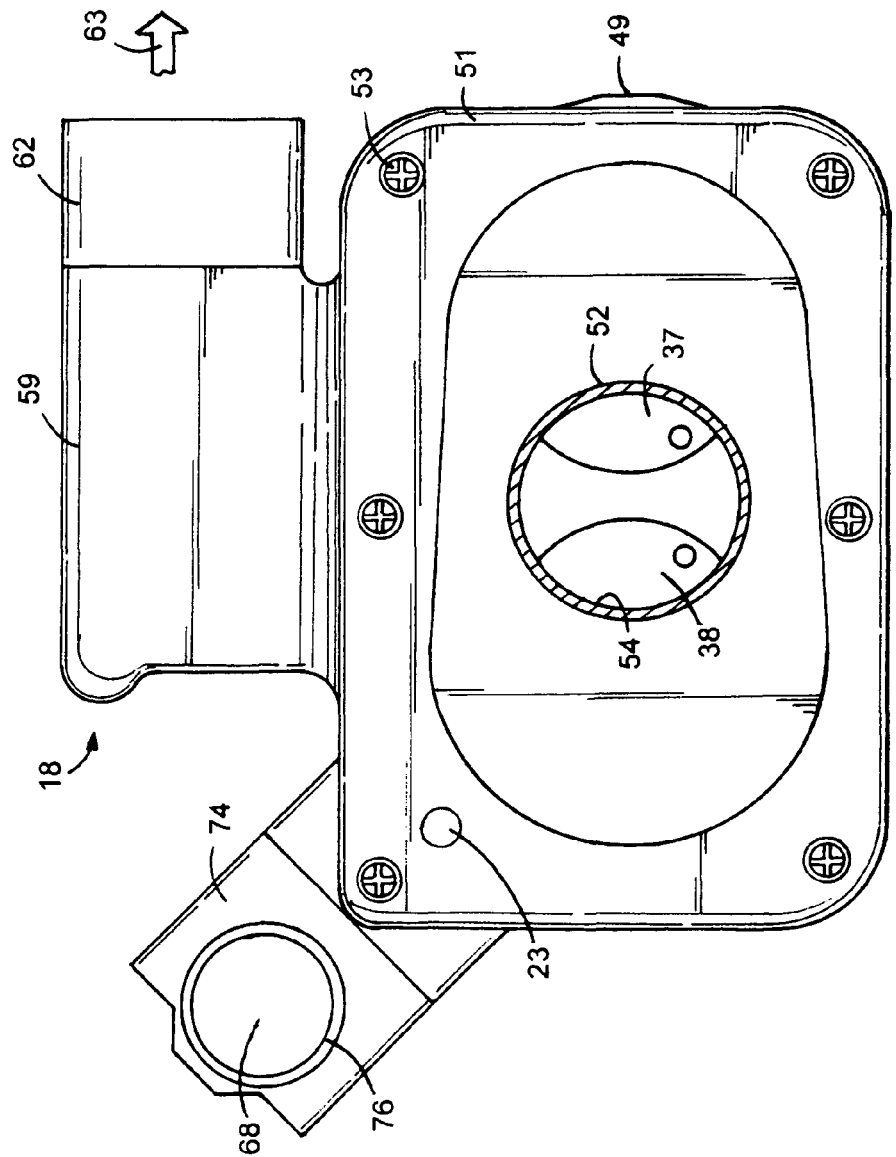
FIG. 4 is an enlarged sectional view taken along line 4-4 of FIG. 1.
Figure 5:
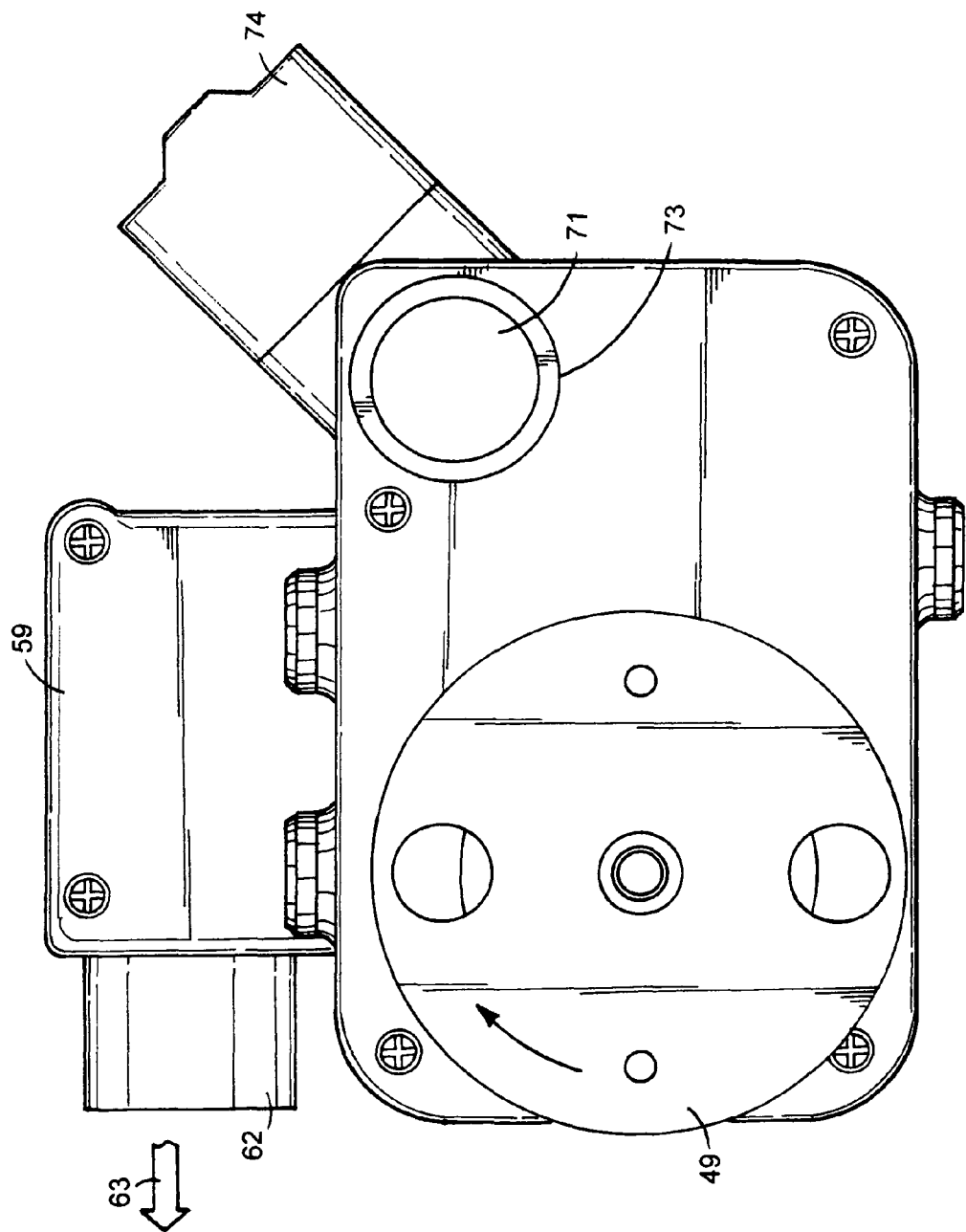
FIG. 5 is an elevational view of the rear end of the supercharger of FIG. 3.

As shown in FIGS. 3, 4, and 7, an inlet end plate 51 having a tubular end 52 is secured with fasteners 53 to end member 39. Tubular end 52 surrounds an air inlet passage 54 open to the air inlet ends of rotors 34 and 36. An air filter 56, shown in FIG. 1, mounted on tubular end 52 separates particulates from ambient air illustrated by arrow 57 and allows clean air to flow into passage 54 and to rotors 34 and 36.

Returning to FIGS. 3 to 6, a box shaped member or temple 59 mounted on top of housing 28 has an internal chamber 61 in air communication with opening 58 for directing air flow shown by arrow 63 through sleeve 62 to an air control apparatus 200 of FIG. 1 or heat exchanger 419 of FIG. 2 that then directs the air flow to an engine intake manifold.

Air flow control slide assembly 22, shown in FIGS. 7, 8, and 9, has member 64 fixed to housing 28 with a pin 66. Member 64 may or may not be needed depending on length and movement of member 71. Member 64 has an inclined face 67 extended between rotor 36 and an air bypass passage 68 in the side of housing 28. Member 64 is optional and serves only to minimize the travel requirement of slide member 71 to achieve maximum air volume displacement or as required for manufacturability. Face 67 has an inclined surface that is generally complementary to the helical angle of the protrusions or vanes of rotor 36. Actuator 23 includes a rod 69 connected to a second slide or member 71. Rod 69 can be threaded into member 71 whereby rotation of rod 69 moves member 71 axially along a passage 73 in housing 28. Other devices and actuators, such as a servomotor, linear actuator, a solenoid or a foot pedal, can be used to adjust the position of member 71 relative to length of rotor 36. The front end of member 71 has an inclined face 72 that is generally parallel to face 67 on the rear end of member 64. The inclined faces 67 and 72 of members 64 and 71 facilitates flow of air, shown by arrows 75, from rotor 36 into air bypass passage 68. A manifold cap 74 mounted on housing 28 over air bypass passage 68 has a passage 76 directing air into a tube 77 to discharge air, shown by arrow 78 in FIG. 1, into the atmosphere. Tube 77 can be coupled to a muffler (not shown) to inhibit noise. The air moved by rotors 34 and 36 keeps rotor surfaces and housing 28 cool as the air that is not directed to an engine is discharged through bypass passage 68 to atmosphere when control slide assembly 22 is in maximum air bypass or partial air bypass positions. The excess hot air is not recycled back to the intake end of rotors 34 and 36 when slide member 71 opens passage 76. Also, this lowers the temperature of the compressed air delivered to the engine.

Figure 10:
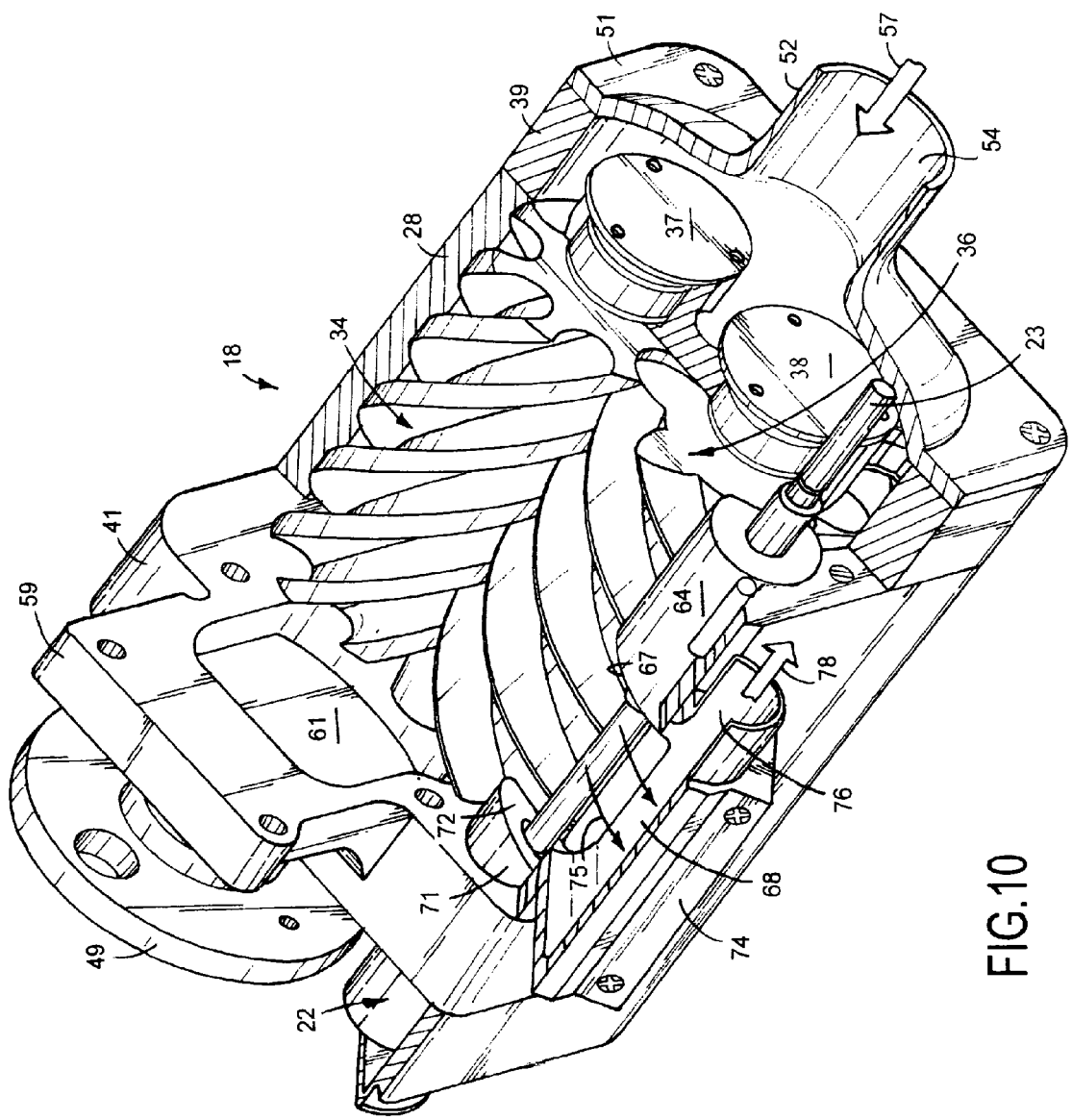
FIG. 10 is a perspective view partly sectioned of the supercharger showing the rotors and air control slide assembly in the maximum air bypass position.

The mass of air flow dispensed by supercharger 18 is changed or altered by adjusting the position of slide assembly 22 relative to rotor 36 to meet the power requirements of engine 11 when operated at above atmospheric air pressure in intake manifold 12. Supercharger 18 being driven by engine 11 is responsive to the rotational speed or RPM of engine 11 to substantially match the rate of air flow delivered to engine 11 with the rate of air flow utilized by the engine. Supercharger 18 can be operated to vary the mass of air flow bypassed to atmosphere or to boost or increase the rate of air flow to engine manifold 12 and increase the mass and pressure of air directed to the engine's combustion cylinders. Air control slide assembly 22 is actuated with actuator 24 between maximum air bypass, partial air bypass and minimum air bypass positions, shown in FIGS. 7 to 12, to regulate the amount of air expelled to atmosphere and the mass of air flow directed by supercharger 18 to engine 11. As shown in FIGS. 7 and 10, movable member 71 of slide assembly 22 is in the maximum air bypass position allowing a minimum mass of air flow to be delivered to engine 11 with excess air being expelled through air bypass opening 68 to atmosphere.

Figure 11:
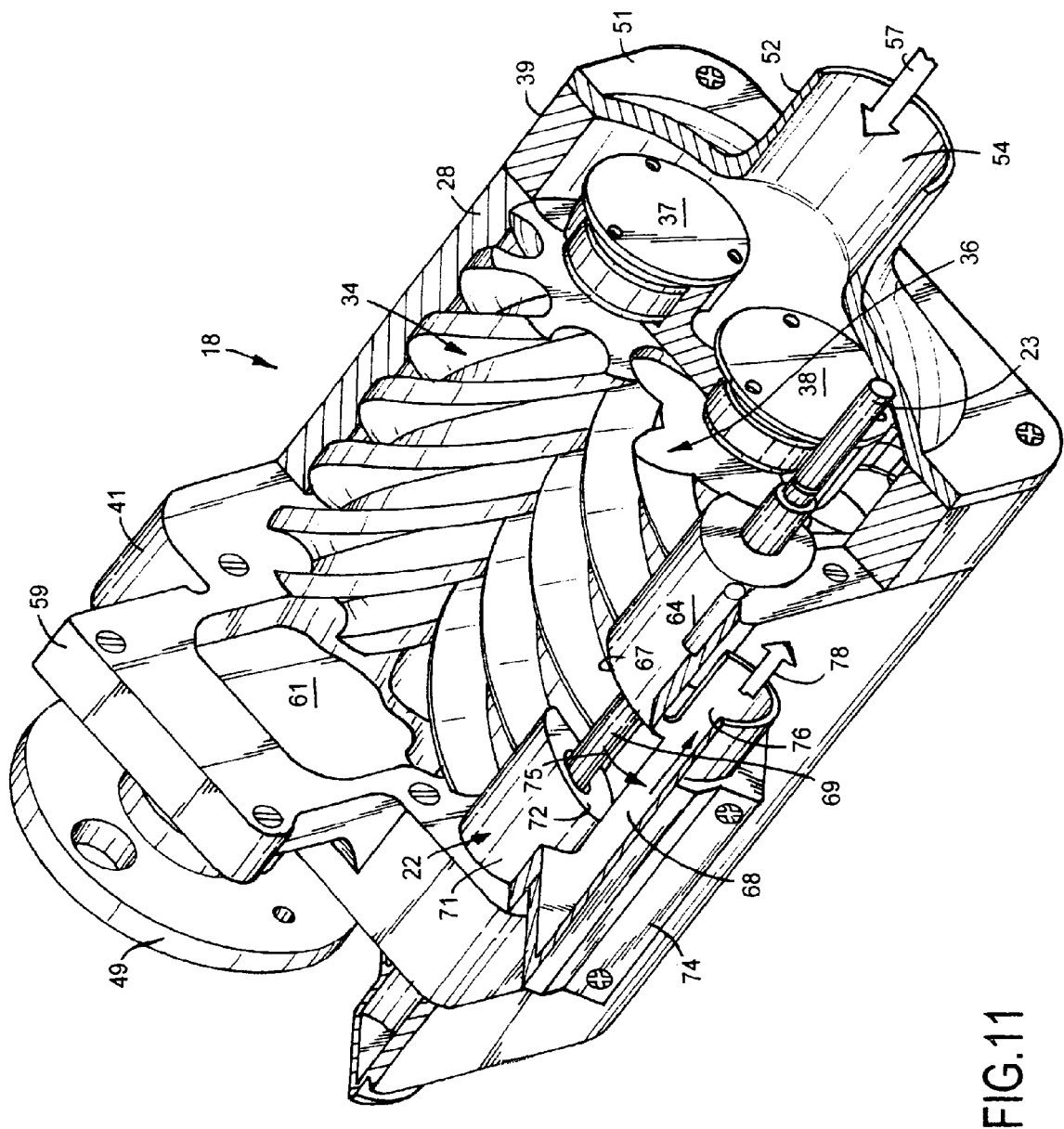
FIG. 11 is a perspective view partly sectioned of the supercharger showing the rotors and air control slide assembly in a partial air bypass position.
Figure 12:
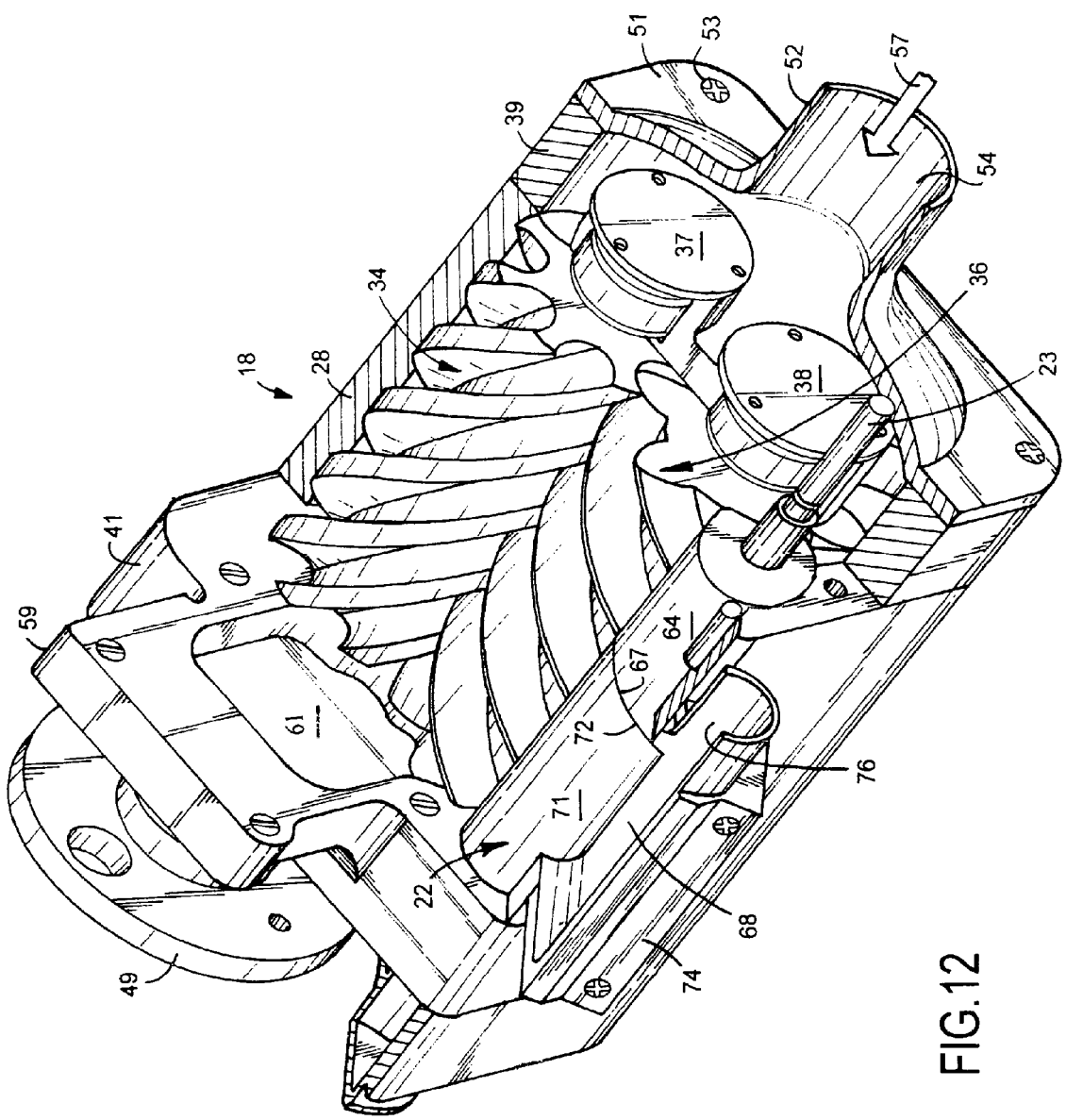
FIG. 12 is a perspective view partly sectioned of the supercharger showing the rotors and air control slide assembly in the minimum air bypass position.
Figure 13:
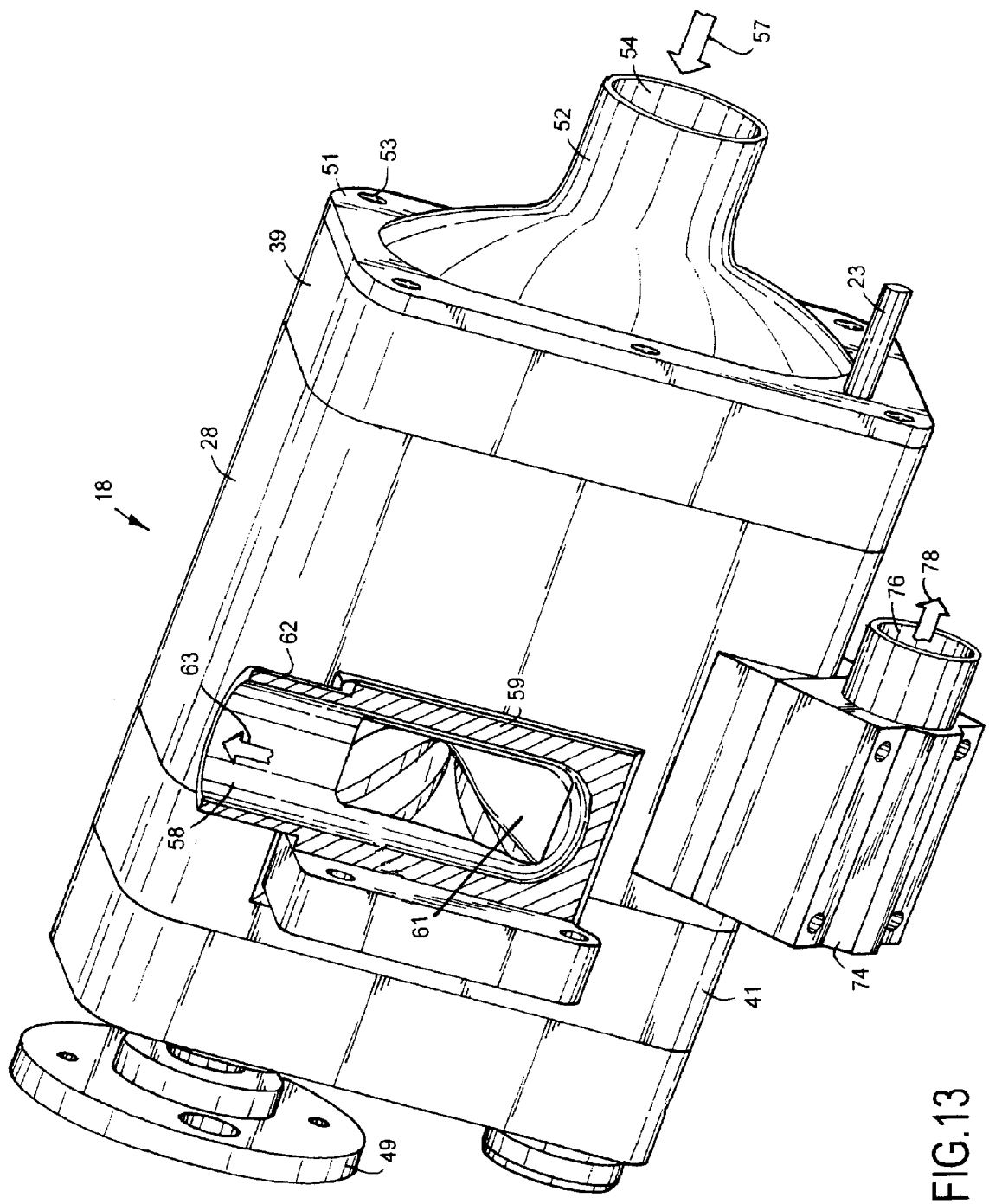
FIG. 13 is a top perspective view partly sectioned of the supercharger of FIG. 2.

As rotors 34 and 36 rotate, the inlet excess air is bypassed to passage 68 and atmosphere until it is trapped by slide member 71. In the maximum air bypass position none of the trapped air undergoes an internal compression prior to delivery to chamber 61 and directed to engine manifold 12. Control slide assembly 22 in FIGS. 8 and 11 is in the partial air bypass position to allow a selected volume of air to be compressed by rotors 34 and 36 and delivered to engine 11. FIGS. 9 and 12 show control slide assembly 22 in the minimum air bypass position to allow a maximum volume of air to be compressed and delivered by the rotors 34 and 36 to engine 11. Air control slide assembly 22 is adjustable between its maximum air bypass, partial air bypass and minimum air bypass positions to vary the amount of air expelled to atmosphere and the pressure and mass of air flow compressed by rotors 34 and 36 to engine 11. The excess air moved by rotors 34 and 36 and directed to atmosphere through bypass passage 68 cools rotors 34 and 36 and housing 28 as the excess air transfers heat generated by the previous compressing of air by rotors 34 and 36. The excess air need not be recycled back to the air inlet of rotors 34 and 36. This also reduces the temperature of the compressed air directed to engine 11. Alternatively, the excess air can be recycled through a heat exchanger and then back to air inlet 54 of supercharger 18.

Supercharger 18 achieves a method of varying the delivery of air to internal combustion engine 11 to efficiently operate the engine at below atmospheric pressure in manifold 12 and with minimum boost or varying levels of boost above atmospheric pressure in manifold 12. A continuous volume of air is generated by the concurrent rotation of rotors 34 and 36. The excess or first portion of the generated mass of air flow is expelled or purged from supercharger 18 to atmosphere. This air is bypass air at nearly atmospheric pressure. A second portion of the generated mass of air flow is directed to the engine 11 in an amount required by the power requirements of the engine. The amount of the first portion of the mass of air flow expelled to atmosphere is controlled with slide assembly 22 to selectively vary the mass of the second portion of the air directed to the internal combustion engine 11. The second volume of air can be further cooled with air cooler 19 prior to introduction of the air to the internal combustion engine. The second mass of air flow can be directly dispensed into manifold 12 of engine 11 if air cooler 19 is not used.

Figure 14:
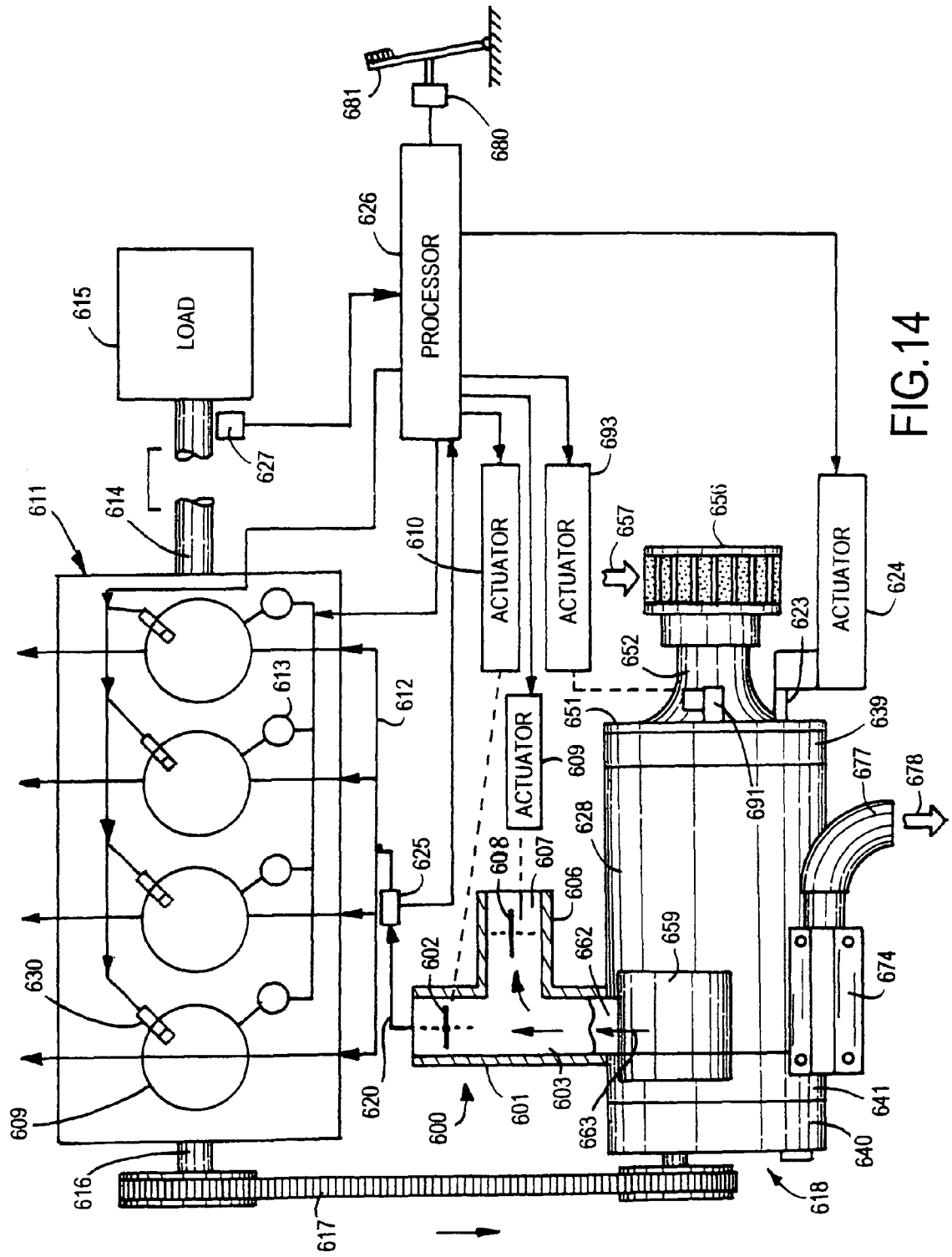
FIG. 14 is a diagram of a fifth embodiment of an internal combustion engine coupled to a load and a modification of the supercharger of the invention.

A fifth embodiment of supercharger 618 of the invention, shown in FIG. 14, is operatively driven with an internal combustion engine 611 having cylinders, an air intake manifold 612, fuel injectors 613, ignition igniters 630 and a power output drive shaft 614. Shaft 614 is operably connected to a load 615. Load 615 is an apparatus such as an electric generator, a pump, a vehicle drive system or a machine for receiving power from engine 611. A front drive shaft 616 of engine 611 is connected to a power transmission 617 that drives supercharger 618. Engine 611 is a conventional internal combustion engine. Air is delivered from supercharger 618 into a tubular housing 601 coupled to manifold 612 with tube 620. Supercharger 618 is connected to an air control apparatus 600 to direct all or a portion of the air to intake manifold 612. A heat exchanger (not shown) similar to heat exchanger 419 of FIG. 2 may be installed between housing 601 and intake manifold 612 if desired. An air mass flow sensor 625 coupled to tube 620 provides electric signals to a processor 626 corresponding to the air mass flow rate and pressure within intake manifold 612. Other devices and methods utilizing air temperature, manifold pressure and engine speed may be used alternatively to determine air mass flow rates.

Figure 17:
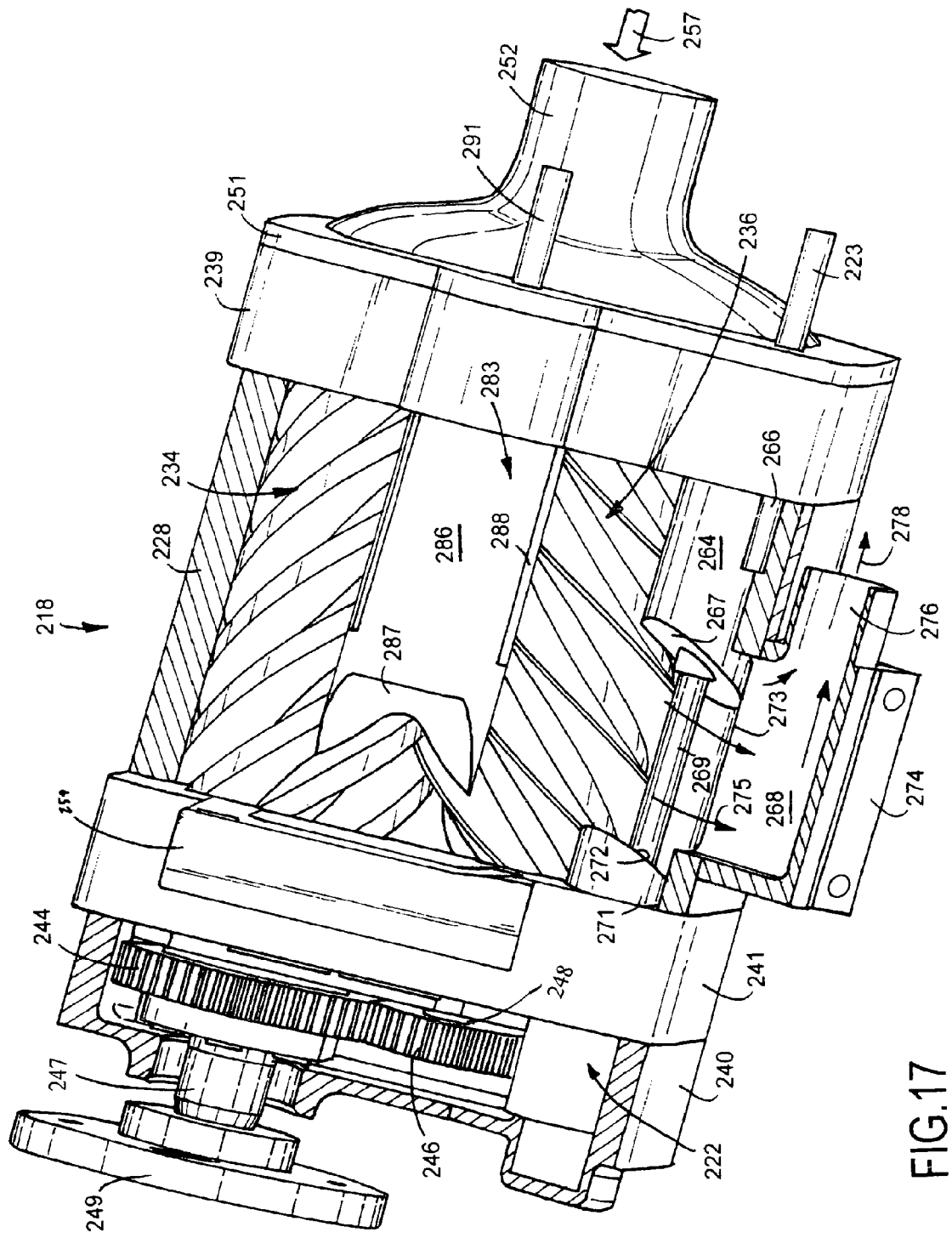
FIG. 17 is a top perspective view partly sectioned of the supercharger of FIG. 15 showing the rotors, the air control slide assembly in the maximum air bypass position and the delivery port control slide assembly.

Supercharger 618 includes an air control apparatus 600 operable to regulate the air mass flowing from supercharger 618 to intake manifold 612 of engine 611 during operation of the engine 611 with intake manifold 612 that can range selectively from below through above atmospheric pressure. Air control apparatus 600 includes a T-coupling or a tubular housing 601 connected to air exit sleeve 662 of supercharger 618 for transporting air from supercharger 618 and intake manifold 612 of engine 611. A first valve assembly 602 located in passage 603 of housing 601 regulates the flow of air in passage 603 to air intake manifold 612. First valve assembly 602 has a generally flat disk throttle valving member pivotally mounted on housing 601 between open and nearly closed positions, shown in broken and full line positions, to throttle or check the flow of air out of supercharger 618 to control the power of engine 611 operating at manifold 612 pressures that are below atmospheric pressure conditions. When first valve assembly 602, shown in broken lines, is fully open supercharger 618 is operable to deliver a controlled mass flow of air to air intake manifold 612 when engine 611 operates at manifold 612 pressures that are above atmospheric pressure conditions. Housing 601 has a side tubular member 606 having air exits passage 607 open to passage 603 and atmosphere. A second valve assembly 608 has a generally flat disk valving member pivotally mounted on member 606 that moves between open and nearly closed positions shown in broken and full lines. An actuator 610 wired to processor 626 is coupled with valve member 602 to progressively control the open to nearly closed positions of valve throttle valve member 602 when engine 611 is operating with manifold 612 pressures that are below atmospheric air pressure conditions. An actuator 609 wired to processor 626 is coupled with valve member 608 to open valve member 608 when engine 611 is operating with manifold 612 pressures that are below atmospheric air pressure conditions. Actuator 624 positions control shaft 623 between maximum air bypass, partial air bypass and minimum air bypass positions of slide assembly 22 shown in FIGS. 7 to 12 to regulate the amount of air expelled to atmosphere and the mass of air flow delivered by supercharger 618 to engine 611. Adjusting the timing or position of the delivery port control slide 283 shown in FIG. 17 provides fine tuning of the pressure at the instant of release from the compressing chamber to most closely match the average pressure of the intake manifold, thus adjusting to suit varied slip rates, intercooler temperature variations, acoustic tuning, engine-driven variable drive ratios, electric motor variable-speed drive systems, and other parameters that affect boost pressure. Pressure sensors, acoustic sensors, and temperature sensors may be used along with lookup maps in processor 626 to optimally position rod 691 and delivery port control slide 283. Processor 626 controls actuator 693 to optimally position rod 691 and delivery port control slide 283.

Figure 14A:
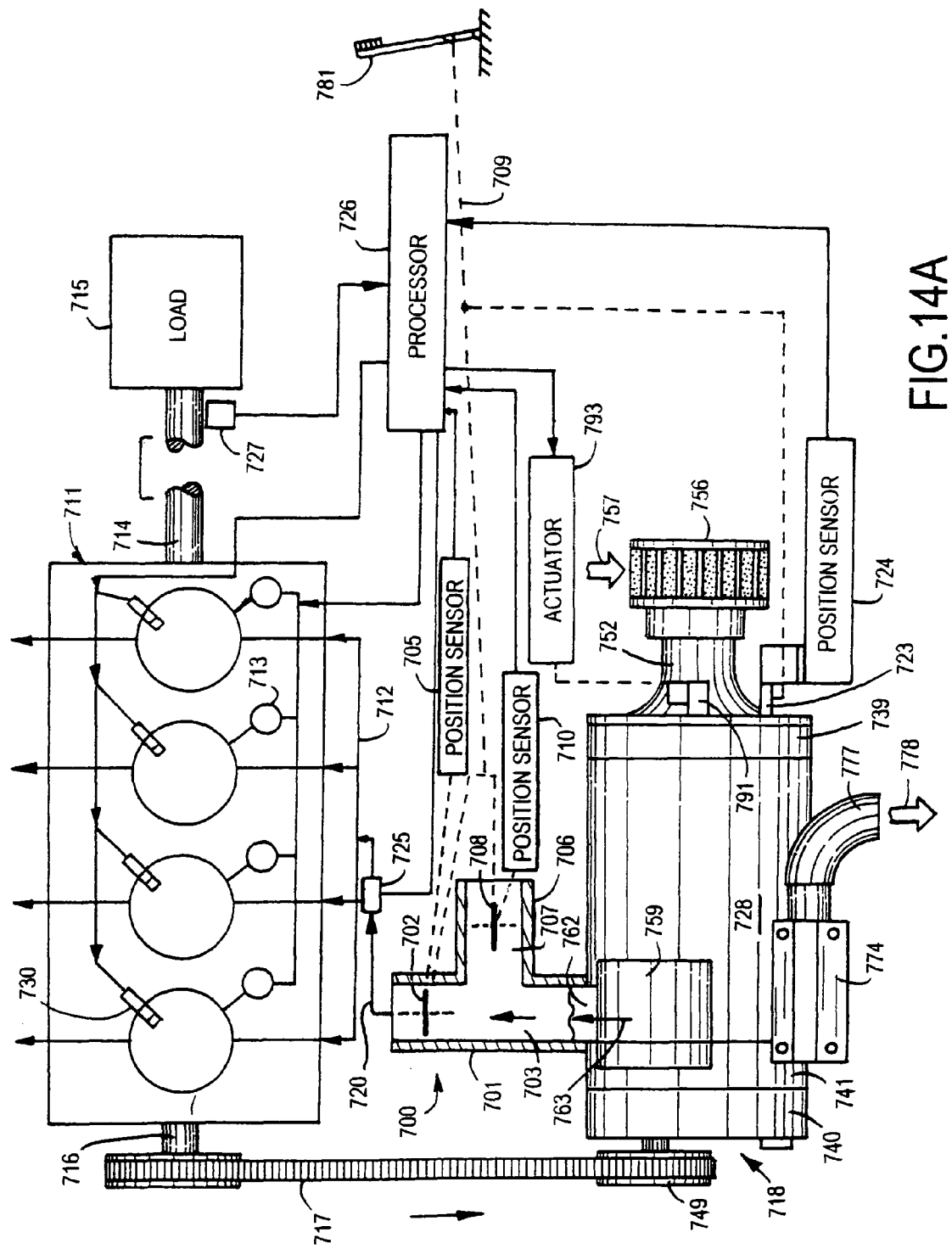
FIG. 14A is a diagram of a sixth embodiment of an internal combustion engine coupled to a load and a modification of the supercharger of the invention.

A sixth embodiment of supercharger 718 of the invention, shown in FIG. 14A, is operatively driven with an internal combustion engine 711 having cylinders, an air intake manifold 712, fuel injectors 713, ignition igniters 730 and a power output shaft 714. A load 715 is coupled to shaft 714. The parts of supercharger 718 that correspond to supercharger 618 shown in FIG. 14 have the same reference numbers with the prefix 7 in lieu of prefix 6 and are incorporated herein by reference. The throttle valve 702, valve 708, and control shaft 723 are mechanically connected with progressive sequential linkage 709 to foot pedal 781. Linkage 709 acts sequentially to first operate valve 702, then valve 708, and then shaft 723 independently of processor 726. Valve position sensors 705, 710 and 724 on valves 702, 708, and shaft 723 also report to processor 726 to assist the transient response of the engine in controlling the injection of fuel into the engines cylinders and ignition of the air fuel mixture in the cylinders. Valve member 702 is substantially closed, as shown in full lines, when engine 711 is operating at idle. The power of engine 711 is increased by moving foot pedal forward whereby linkages 709 progressively and sequentially turn valve 702 to its open position and turns valve 708 to its fully closed position. The air mass directed to air intake manifold 712 is increased along with the pressure of the air in air intake manifold 712. A heat exchanger (not shown) similar to heat exchanger 419 of FIG. 2 may be installed between housing 701 and intake manifold 712 if desired. The boost of the air mass in air intake manifold 712 and corresponding fuel rate increases the power output of engine 711. Supercharger 718 is operable to vary the air mass and pressure in air intake manifold 712 in accordance with the power requirement of engine 711. Processor 726 controls the injection of fuel into the cylinders and ignition of the air fuel mixture in the cylinders based upon inputs from sensors such as mass airflow, engine speed, exhaust oxygen, manifold pressure, and valve position sensors. Adjusting the timing or position of the delivery port control slide 283 shown in FIG. 17 provides fine tuning of the pressure at the instant of release from the compressing chamber to most closely match the average pressure of the intake manifold, thus adjusting to suit varied slip rates, intercooler temperature variations, acoustic tuning, engine-driven variable drive ratios, electric motor variable-speed drive systems, and other parameters that affect boost pressure. Pressure sensors, acoustic sensors, and temperature sensors may be used along with lookup maps in processor 726. Processor 726 controls actuator 793 to optimally position rod 791 and delivery port control slide 283.

Figure 14B:
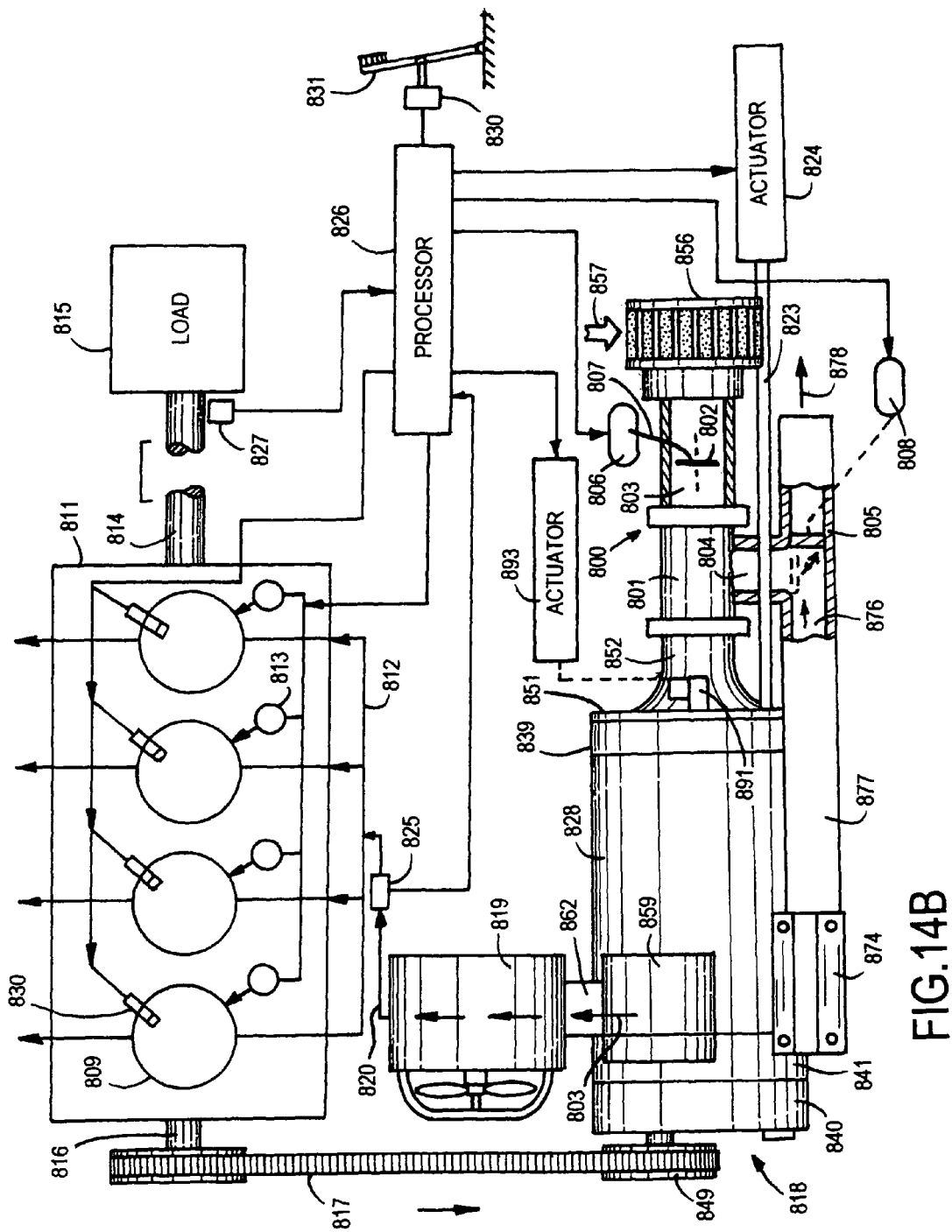
FIG. 14B is a diagram of a seventh embodiment of an internal combustion engine coupled to a load and a modification of the supercharger of the invention.

A seventh embodiment of supercharger 818, shown in FIG. 14B, driven with a conventional internal combustion engine 811 is operable to selectively direct an air mass at below atmospheric pressure or above atmospheric pressure according to the power requirements of engine 811. Engine 811 includes a plurality of cylinders 809 in air communication with an air intake manifold 812. Fuel injectors 813 wired to a processor 826 function to introduce fuel, such as gasoline or hydrogen, into cylinders 809 during the compression of air in cylinders 809. Fuel can be introduced into the air in intake manifold 812. Engine 811 has a power output shaft 814 connected to a load 815. The parts of supercharger 818 that correspond to supercharger 618, shown in FIG. 14, have the same reference numbers with the prefix 8 in lieu of 6 and are incorporated herein by reference.

An air control apparatus 800 is operable to regulate the air mass flowing into supercharger 818 which in turn controls the air mass flowing into air intake manifold 812 of engine 811. Supercharger 818 discharges air into an air cooler or heat exchanger 819 coupled to air intake manifold 812 with a tube 820. Air control apparatus includes a tubular member or T-coupling 801 connected between the air inlet 852 of supercharger 818 and air filter 856. A throttle valve 802 located in passage 803 is pivotally mounted on tubular housing 801 for movement between fully open and nearly closed positions to regulate the air mass flowing into supercharger 818. Tubular housing 801 has a side passage 804 open to supercharger bypass air passage 876. A second valve member 805 pivotally mounted on housing 877 is movable to close passage 876 from atmosphere and open to passage 804 whereby bypass air flows from supercharger 818 back to passage 803. When valve member 805 is in the position, as shown in solid lines, there is nearly unrestricted flow of air through passage 803 and into supercharger 818. Supercharger 818 can then be operated to not boost the air mass directed to the engine when throttle valve 802 is partly closed. An actuator 806 wired to processor 826 is connected with a linkage 807 to valving member 802 to regulate the flow of air mass into supercharger 818 to control the power of the engine during below atmospheric pressure conditions within manifold 812. Valving member 805 is operably connected to an actuator 808 with a linkage 809. Actuator 808 wired to processor 826 directs command signals to actuator 808 which operates to move valve member 805 to either block access of air to passage 876 to atmosphere or to passage 804. Actuator 824 positions shaft 823 between maximum air bypass, partial air bypass and minimum air bypass positions of slide assembly 22 shown in FIGS. 7 to 12 to regulate the amount of air expelled to atmosphere and the mass of air flow delivered by supercharger 818 to engine 811. Processor 826 controls the injection of fuel into the cylinders and ignition of the air fuel mixture in the cylinders based upon inputs from sensors such as mass airflow, engine speed, exhaust oxygen, manifold pressure, and valve position sensors. Adjusting the timing or position of the delivery port control slide 283 shown in FIG. 17 provides fine tuning of the pressure at the instant of release from the compressing chamber to most closely match the average pressure of the intake manifold, thus adjusting to suit varied slip rates, intercooler temperature variations, acoustic tuning, engine-driven variable drive ratios, electric motor variable-speed drive systems, and other parameters that affect boost pressure. Pressure sensors, acoustic sensors, and temperature sensors may be used along with lookup maps in processor 826 to optimally position rod 891 and delivery port control slide 283. Processor 826 controls actuator 893 to optimally position rod 891 and delivery port control slide 283.

Figure 14C:
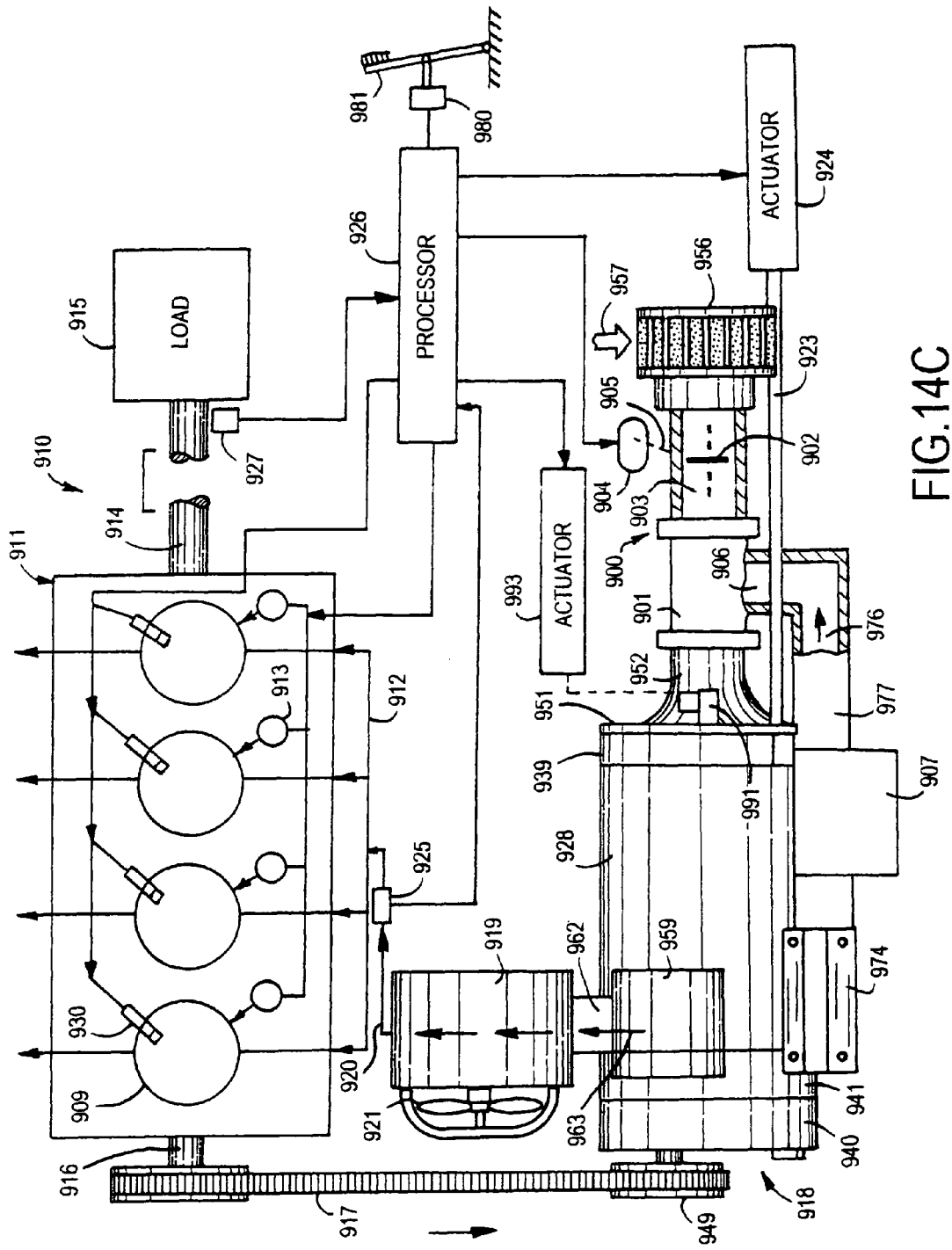
FIG. 14C is a diagram of an eighth embodiment of an internal combustion engine coupled to a load and a modification of the supercharger of the invention.

An eighth embodiment of the supercharged internal combustion power unit 910 is shown in FIG. 14C. The parts of power unit 910 that correspond to the parts of power units 810 have the same reference numbers with a prefix 9 and are incorporated herein. An air control apparatus 900 interposed between supercharger 918, air inlet 952 and air filter 956 controls the air mass flow of air into supercharger 918. Air control apparatus 900 includes tubular member or T-coupling 901 having an air passage 903 for accommodating air flowing into supercharger 918. A throttle valve member 902 located in passage 903 is pivotally mounted on tubular member 901 for movement between a nearly closed position, shown in full lines, and an open position, shown in broken lines to control the air mass flowing into supercharger 918. An actuator 904 wired to processor 926 and connected to valve member 902 with linkage 905 controls the open and nearly closed positions of valve member 902. Actuator 904 is responsive to command signals generated by processor 926 responsive to the position sensor 980 of foot pedal 981 or other engine control devices. Tubular housing 901 has a side passage 906 open to passage 903 and supercharger bypass air passage 976. Tube 977 is connected to tubular housing 901 whereby the bypass air flowing in passage 976 flows back to the air inlet passage 903 and to supercharger 918. An air cooler or heat exchanger 907 interposed in tube 977 cools the bypass air flowing in passage 976 back to air intake passage 903 and supercharger 918. Air cooler 907 may be omitted from tube 977 if desired.

The volume of air bypassed to atmosphere and the volume of air moved by supercharger 918 of FIG. 14C, or equivalent supercharger 218 of FIGS. 15 through 20, to engine 911 is regulated with an air control slide assembly 222 of FIGS. 17, 18, 19, and 20. Slide assembly 222 includes a slide or member 271 movable between maximum air bypass, partial air bypass and minimum air bypass positions with control rod 223. An actuator 924 operatively coupled to rod 923 moves member 271 between maximum air bypass, partial air bypass and minimum air bypass positions to regulate the volume of air flow from supercharger 918 to engine 911.

Actuator 924 operably connected to shaft 923 is wired to a processor 926 that directs the operation of actuator 924. Processor 926 is also wired to air mass flow sensor 925. A sensor 927 operable to generate signals responsive to the speed of rotation of drive shaft 914 provides processor 926 with data signals which are processed by the electronic components of processor 926 to provide control or command signals that operate actuator 924 changes the position of slide assembly 222 to regulate the volume of air bypassed to atmosphere and the volume of air compressed and dispensed by supercharger 918 to engine 911. A manually operated device 980 is operable with foot pedal 981 to provide positional input related to the power demand of the operator to processor 926 to change the positions of control slide assembly 222 to regulate the volume of air bypassed to atmosphere and delivered to engine 911. Air mass flow sensor 925 also provides electric signals to processor 926 to regulate the control slide assembly 222 and discharge of fuel into the combustion chamber of the engine.

Supercharger 218, shown in FIGS. 15 to 20, has a housing 228 with a pair of parallel cylindrical walls 229 and 232 surrounding cylindrical chambers 231 and 233. The chambers 231 and 233 have intersecting adjacent arcuate sections. A female screw or rotor 234 extended along chamber 231 cooperates with a male screw or rotor 236 located in chamber 233 to move air along the lengths of rotors 234 and 236. Rotors 234 and 236 have the same grooves and protrusions or lands as rotors 34 and 36. Other sizes, shapes and lengths of rotors can be used in supercharger 218. Rotors 234 and 236 are concurrently rotated by engine 911 with power transmission 917 coupled with spur gears 244 and 246, connected to rotor shafts 247 and 248 surrounded by housing 240. Rotors 234 and 236 are rotated at rotational speeds related to the rotational speed of the engine's drive shaft 916. A separate drive device, such as an electric motor, can be used to rotate rotors 234 and 236.

Returning to FIG. 19, end members 239 and 241 secured to opposite ends of housing 228 support bearings 237 and 238 accommodating the rotor shafts. An air inlet plate 251 having a tubular end 252 is secured to end member 239 with fasteners 253. Tubular end 252 has an air inlet passage 254 open to the air inlet ends of rotors 234 and 236 to allow air, shown by arrow 257, to flow into supercharger 218. An air filter 956, shown in FIG. 14C, mounted on tubular end 952 separates particulates from the ambient air drawn through air filter 956 into air inlet passage 954. Other types of air cleaners can be used to remove foreign materials from the air flowing into supercharger 218.

Figure 15:
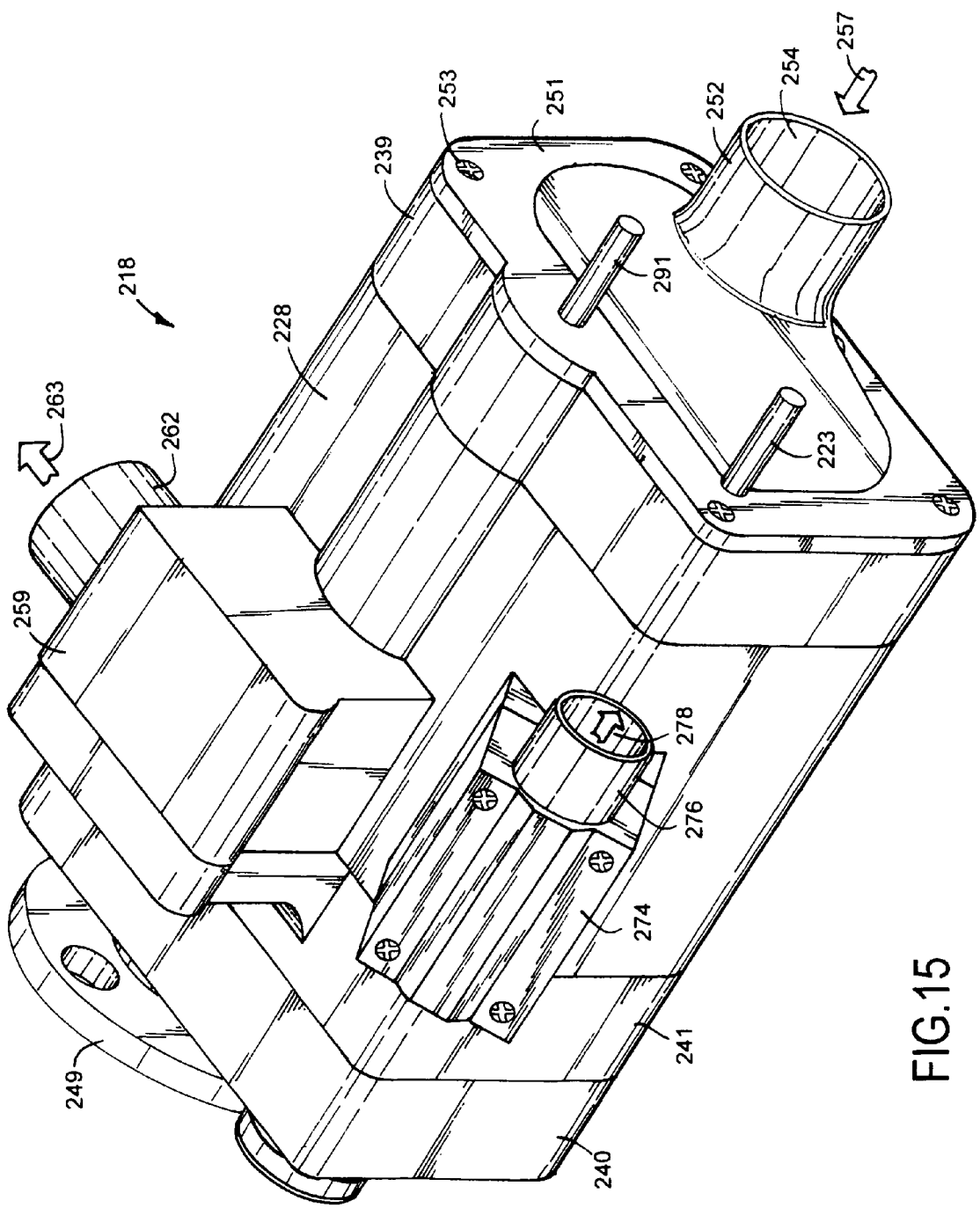
FIG. 15 is an enlarged perspective view of the supercharger of FIG. 14.
Figure 16:
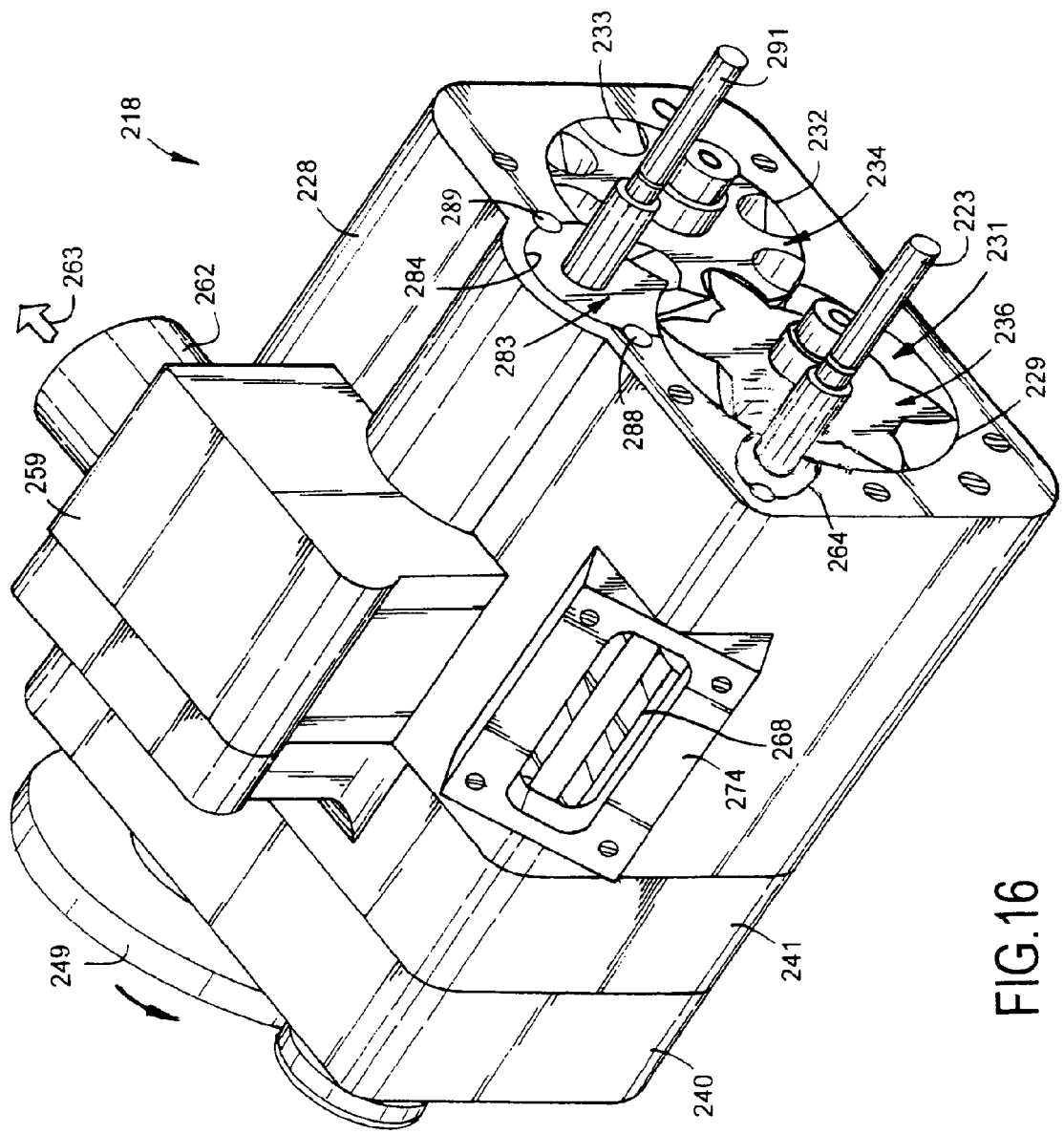
FIG. 16 is a perspective view of the supercharger of FIG. 15 showing the rotors.
Figure 20:
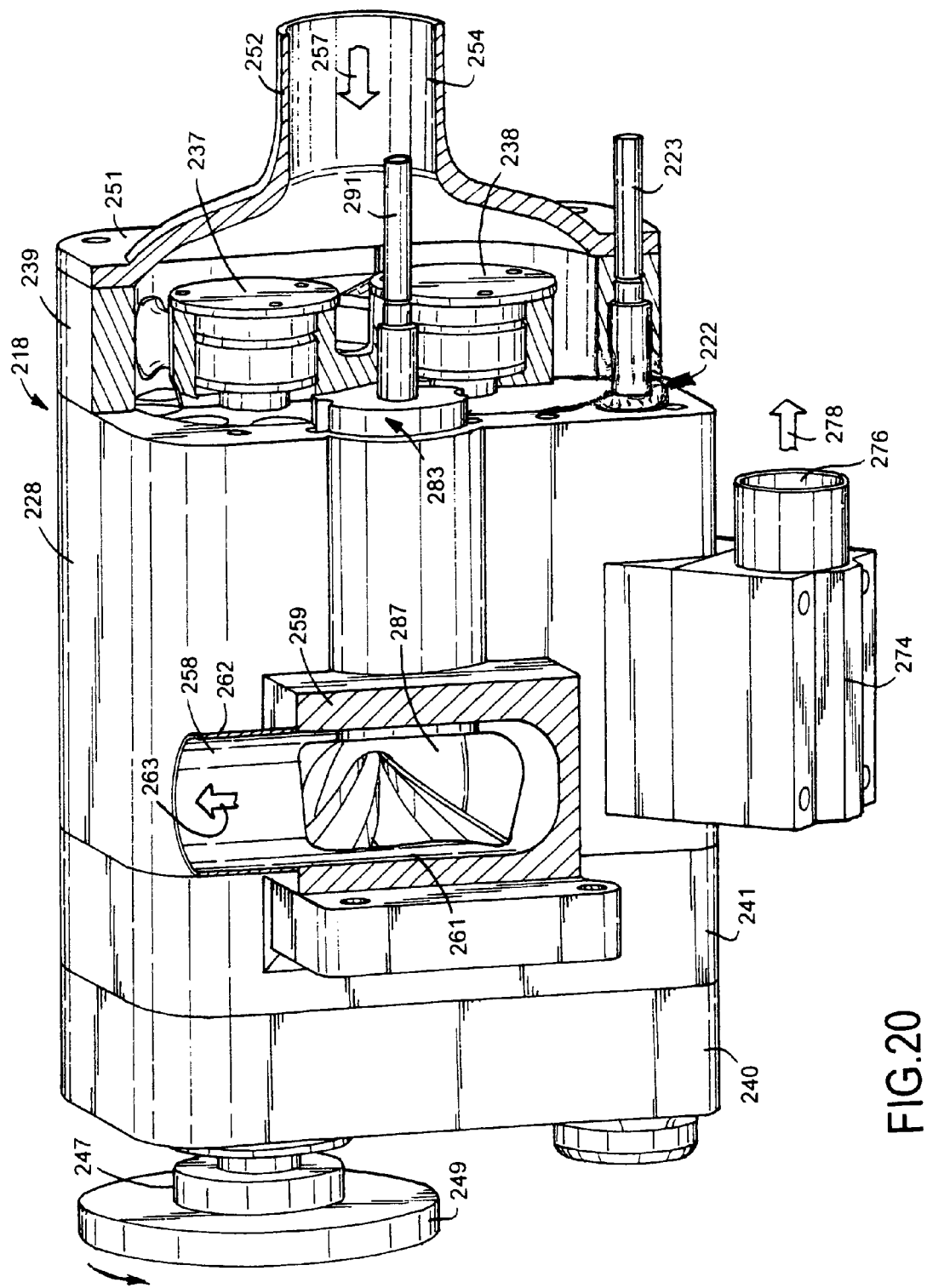
FIG. 20 is a top perspective view partly sectioned of the supercharger of FIG. 15.

As shown in FIGS. 15, 16 and 20, a temple or box shaped member 259 mounted on housing 228 has an internal passage 261 in communication with the rear ends of chambers 231 and 233 for receiving air compressed by rotors 234 and 236. The air, shown by arrow 263, flows through passage 258 in sleeve 262 to heat exchanger 919 and to engine 911. The air from supercharger 918 flows into an air mass flow sensor 925 interposed in conduit 920. Air mass flow sensor 925 provides electric signals relating to the mass of air flow and pressure of air within the manifold to a processor 926 that controls supercharger 918, the fuel delivered into combustion chambers and ignition of the fuel during operation of the engine 911.

Figure 18:
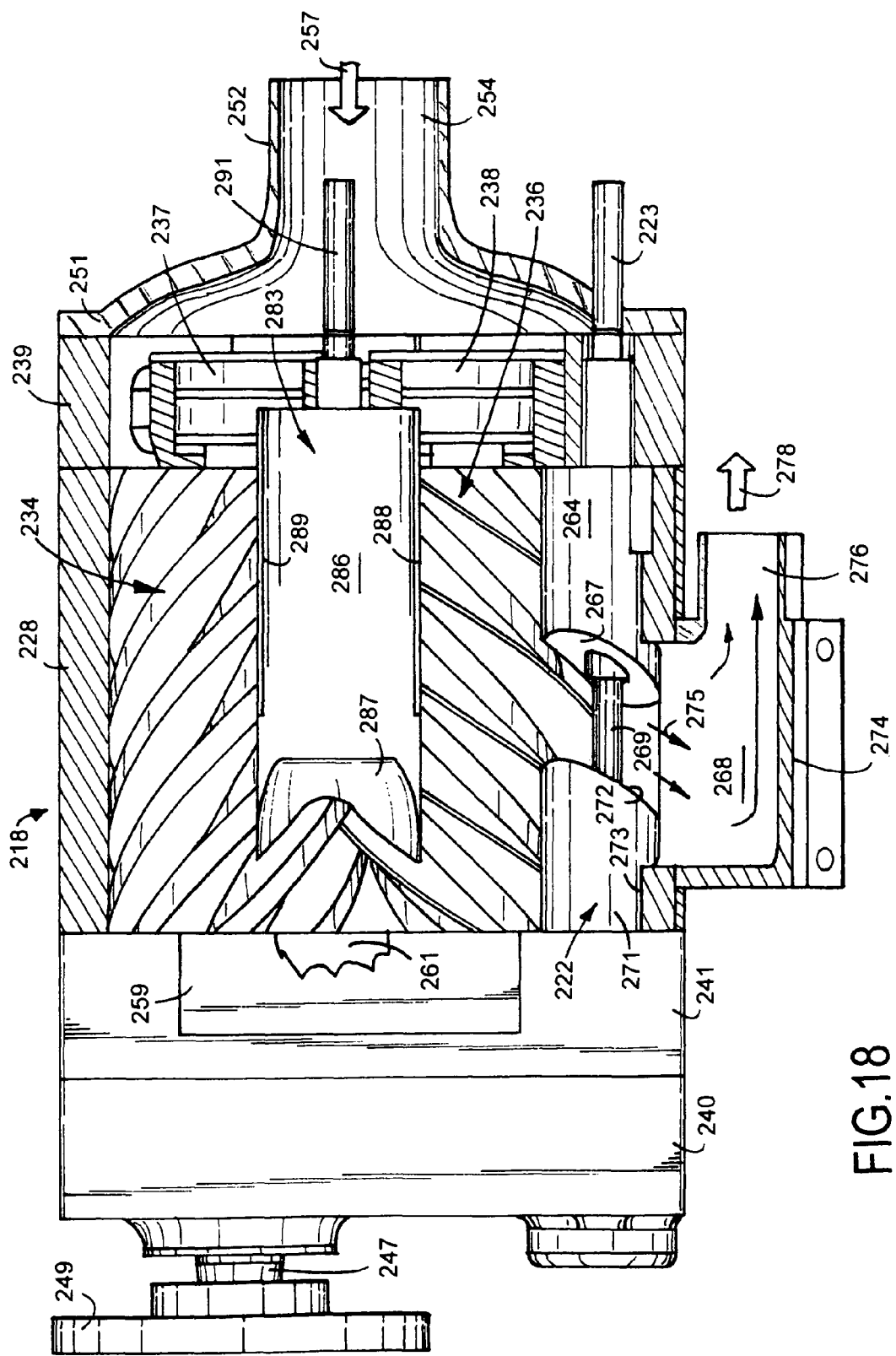
FIG. 18 is a top plan view partly sectioned of the supercharger of FIG. 15 showing the rotors, the air control slide assembly in the partial air bypass position and the delivery port control slide assembly.
Figure 19:
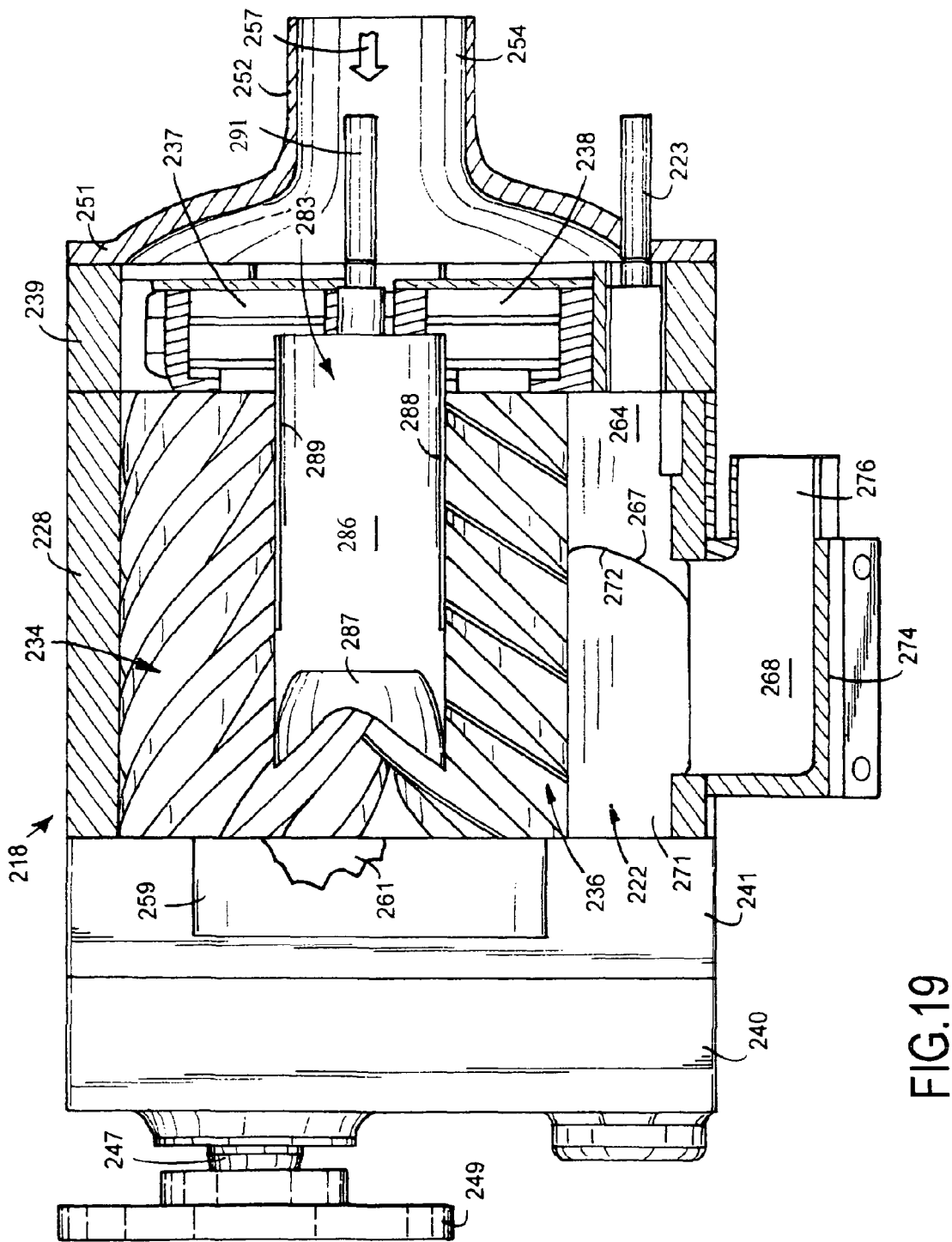
FIG. 19 is a top plan view partly sectioned of the supercharger of FIG. 15 showing the rotors, the air control slide assembly in the minimum air bypass position and the delivery port control slide assembly.

Air flow control slide assembly 222, shown in FIGS. 17 to 19, has a first slide or member 264 fixed to housing 228 with a pin 266 and a second slide or member 271 axially aligned with first member 264. Members 264 and 271 have the same structure as slide members 64 and 71. Member 271 is axially moveable in a bore 273 in housing 222 adjacent a side of rotor 236. A control rod 223 extended through member 264 is operatively connected to member 271 to axially move member 271 relative to member 264 to maximum air bypass, partial air bypass and minimum air bypass positions, shown in FIGS. 17, 18 and 19, relative to an air bypass passage 268 in communication with atmosphere. When member 271 is in the maximum air bypass position, shown in FIG. 14 and FIG. 17, a first portion of air moved by rotors 234 and 236 is delivered into passage 268 to atmosphere, as shown by arrow 278. A second portion of air is moved without being compressed to the engine's combustion chambers. The bypassed air is not recycled back to the air inlet of rotors 234 and 236. Alternatively, as shown in FIG. 14C, the excess air can be recycled through an air cooler 907 back to the air inlet 952 of supercharger 918. The air moved by rotors 234 and 236 that is expelled through bypass passage 268 cools rotors 234 and 236 and adjacent housing 228. This also lowers the temperature of the air directed to the combustion chambers of engine 911. Control slide assembly 222, shown in FIG. 19, is in the minimum air bypass position whereby a maximum mass of air flow is delivered to engine 911 by rotors 234 and 236. When control slide assembly 222 is in the maximum air bypass position, shown in FIG. 17, a minimum mass of air flow is delivered to engine 911 and maximum mass of excess air, shown by arrows 275, is expelled through bypass passage 268. As shown in FIGS. 14, and 16 to 19, bypass passage 268 is covered with a cap 274 connected to a sleeve that directs air, shown by arrow 278, into a curved tube 277 to atmosphere. Tube 277 can include a muffler to inhibit noise. Member 271 of air control slide assembly 222 is moved with actuator 223 between maximum air bypass, partial air bypass and minimum air bypass positions to vary the opening between members 264 and 271 to change the mass of air flowing into air bypass passage 268 and to atmosphere and the mass of air flow directed to the combustion chambers of the engine. This adjustment of member 271 selectively increases or decreases the mass of air flow compressed and directed by supercharger 918 to engine 911 according to the power requirements of engine 911.

A second slide assembly 283 is axially moveable along a channel 284 in housing 228 open to the top of the intersecting cleavage portions of chambers 231 and 233 to regulate the pressure of the air compressed by supercharger 918 for delivery to engine 911 at a closely matched pressure. Adjusting the timing or position of the delivery port control slide 283 shown in FIG. 17 provides fine tuning of the pressure at the instant of release from the compressing chamber to most closely match the average pressure of the intake manifold, thus adjusting to suit varied slip rates, intercooler temperature variations, acoustic tuning, engine-driven variable drive ratios, electric motor variable-speed drive systems, and other parameters that affect boost pressure. Pressure sensors, acoustic sensors, and temperature sensors may be used along with lookup maps in processor 926 to optimally position rod 991 and delivery port control slide 283. Processor 926 controls actuator 993 to optimally position rod 991 and delivery port control slide 283. Delivery port control slide assembly 283 has an elongated body 286 having a convex curved top and a downwardly directed V-shaped bottom located in the cleavage between rotors 234 and 236. The rear or air outlet end has a downwardly and rearwardly directed end wall 287 facing passage 261 in box shaped member 259 to allow air to flow from rotors 234 and 236 into passage 261. Guide rails 288 and 289 cooperating with opposite sides of body 286 support body 286 on housing 228 for linear movement relative to rotors 234 and 236. An axial rod 291 connects body 286 to an actuator 993 operable to move body 286 relative to rotors 234 and 236 to change the air pressure at the instant of release from the compressing chamber to most closely match the average pressure of the intake manifold 912 of engine 911. Returning to FIG. 14, processor 626 operates actuator 693 in response to a program dictated by processor 626 and signals from a manifold pressure sensor (not shown) and an air mass flow sensor 625 in conduit 620. The volumes of air directed to engine 611 and purged through bypass opening 268 of FIG. 17 to atmosphere are regulated with air control slide assembly 222 of FIG. 17 according to the power requirements of engine 611.

Supercharger 18, shown in FIGS. 7, 8 and 9, has one air flow control slide assembly 22 coupled to an operator rod operable to control maximum air bypass, partial air bypass and minimum air bypass positions of slide assembly 22 to regulate a first portion of air bypassed to atmosphere and to supply a second portion of air to the intake manifold of the engine to meet the load requirements of the engine. A second air flow control slide assembly can be included in the supercharger coupled to an actuation to control maximum air bypass, partial air bypass and minimum air bypass positions of the slide assembly. The second slide assembly can be located adjacent to rotor 34 and open to chamber 33 to allow air to bypass to atmosphere. The second slide assembly has the same structures and functions as slide assembly 22. Processor 26 via a controller operates the actuator to control the maximum air bypass, partial air bypass and minimum air bypass positions of the slide assembly.

The invention has been shown and described with reference to preferred embodiments of positive displacement air superchargers with air mass flow controls for any internal combustion engine that requires intake manifold air pressures below atmospheric air pressure when operating at part-load without boost through full-load with boost and methods of providing power to power users. Modifications of the superchargers, air mass flow controls, air flow control slide assemblies and methods can be made by persons skilled in the art without departing from the invention.

The invention claimed is:

1. A method of supplying a mass of air to an internal combustion engine comprising:

generating a continuous mass of air flow with a supercharger, expelling a first portion of the mass of air flow without compression with the supercharger above atmospheric pressure to an air passage, compressing a second portion of the mass of air flow with the supercharger, directing a second portion of the compressed mass of air flow from the supercharger to the internal combustion engine, and controlling the first portion of the mass of air flow without compression expelled to the air passage to selectively regulate the flow of the second portion of the mass of compressed mass of air flow directed to the internal combustion engine to regulate power of the internal combustion engine.

2. The method of claim 1 including:

cooling the second portion of the mass of compressed air flow prior to directing the second portion of the mass of air flow to the internal combustion engine.

3. The method of claim 1 wherein:

the generating of a continuous mass of air flow is created by a supercharger having a pair of rotating cooperating rotors, and controlling the first portion of the mass of air flow without compression expelled to atmosphere with a movable slide assembly that regulates the mass of air flowing from the rotors to the air passage.

4. The method of claim 1 wherein:
the second portion of the compressed mass of air flow directed to the engine is responsive to the power requirements of the engine.

5. The method of claim 1 including:
directing the first portion of air without compression expelled into an air passage to the air intake of the supercharger.

6. The method of claim 5 including:
cooling the mass of air expelled into the air passage before the mass of air is directed to the supercharger.

7. A method for supplying power to a power user comprising:
operating an internal combustion engine having an air intake manifold and at least one combustion chamber for accommodating a mass of air and fuel,
drivably connecting the internal combustion engine to the power user whereby the power user imparts a load on the internal combustion engine,
generating a mass of air flow with a supercharger,
expelling a first portion of the mass of air flow without compression with the supercharger to an air passage,
compressing a second portion of the mass of air flow with the supercharger,
directing the second portion of the compressed mass of air from the supercharger to the internal combustion engine,
controlling the first portion the mass of air flow without compression expelled to the air passage to selectively regulate the flow of the second portion of the mass of compressed mass of air flow directed to the internal combustion engine to regulate the power of the internal combustion engine,
driving the supercharger with the internal combustion engine, and
introducing fuel into the combustion chamber of the internal combustion engine corresponding to the compressed second portion of the mass of air flow delivered to the air intake manifold of the internal combustion engine to meet load requirements of the internal combustion engine.

8. The method of claim 7 wherein:
the mass of air delivered to the air intake manifold of the internal combustion engine is generated by operation of a positive air displacement supercharger.

9. The method of claim 7 wherein:
the mass of air delivered to the combustion chamber of the internal combustion engine is controlled by adjusting the operation of the positive air displacement supercharger to regulate the second portion of the mass of air delivered to the air intake manifold responsive to the load on the internal combustion engine.

10. The method of claim 7 wherein:
the supercharger is operated to generate a continuous mass of air,
expelling a first portion of the mass of air without compression generated by the supercharger to atmosphere,
directing a second portion of the compressed mass of air generated by the supercharger to the air intake manifold of the internal combustion engine, and
controlling the amount of the first portion of the mass of air expelled to atmosphere to selectively regulate the second portion of the compressed mass of air directed to the air intake manifold of the internal combustion engine.

11. The method of claim 7 including:
cooling the second portion of the compressed mass of air prior to directing the second portion of the compressed mass of air to the air intake manifold of the internal combustion engine.

12. The method claim 7 wherein:
the generating of a continuous mass of air flow is created by rotating a pair of cooperating rotors, and
the controlling of the amount of the first portion of the uncompressed mass of air flow expelled to atmosphere employs a movable slide assembly that regulates the mass of air flow from the rotors to atmosphere.

13. The method of claim 7 wherein:
the second portion of the mass of air directed to the air intake manifold of the engine is responsive to the load on the engine.

14. An air control system for an internal combustion engine comprising:
a supercharger for generating a mass of air,
wherein said supercharger includes:
a housing,
a chamber and an air bypass opening in communication with the chamber and an air bypass passage, and
an air delivery port open to the chamber for directing a mass of air to the internal combustion engine,
a rotor assembly located in the chamber of the housing operable to move a first portion of the mass of air without compression through the air bypass opening to the air bypass passage and to move a compressed second portion of the mass of air to the air delivery port and internal combustion engine,
a control apparatus including a slide assembly movably mounted on the housing between maximum air bypass, partial air bypass and minimum air bypass positions relative to the rotor assembly and air bypass opening whereby the first portion of the mass of air moved without compression by the rotor assembly is expelled to the air bypass opening and to the air exit passage when the slide assembly is in maximum air bypass and partial air bypass positions, and the compressed second portion of the mass of air moved and compressed by the rotor is moved to the air delivery port and the internal combustion engine,
an actuator operably connected to the slide assembly to selectively move the slide assembly between the maximum air bypass, partial air bypass and minimum air bypass positions, and
a valve assembly operable to control the compressed second portion of the mass of air from the supercharger to the internal combustion engine.

15. The air control system of claim 14 wherein:
the valve assembly includes
a throttle valve member located between the supercharger and internal combustion engine adapted to regulate the second portion of the mass of air flowing to the internal combustion engine,
a vent valve member located between the supercharger and throttle valve member adapted to selectively allow or prevent the second portion of the mass of air to flow to atmosphere, and
a second actuator operably connected to the vent valve member to control the vent valve member in conjunction with the throttle valve member for regulating the second portion of the mass of air flow to the internal combustion engine.

16. The air control system of claim 14 including:
a second air control slide assembly located adjacent the rotor assembly operable to control the second portion of the mass of air released at the air delivery port, and an actuator operably connected to the second air control slide assembly to move the second air control slide assembly relative to the rotor assembly.

17. A supercharged internal combustion engine comprising:
an internal combustion engine having an air intake manifold and at least one combustion chamber for accommodating a mass of air and fuel and receiving the mass of air from the intake manifold,
a supercharger operable to supply the mass of air to the intake manifold of the engine according to the air requirements of the internal combustion engine for a given power output of the internal combustion engine,
wherein said supercharger includes:
a housing having an internal chamber,
an air inlet passage open to the internal chamber to allow a mass of air to flow into the internal chamber of the housing, and
an air bypass opening and an air bypass passage open to the air bypass opening and open to the air inlet passage,
rotors rotatably mounted on the housing and located in the internal chamber operable to move a first portion of the mass of air without compression through the air bypass opening to the air bypass passage and into the air inlet passage whereby the first portion of the mass of air flows to the air inlet passage of the supercharger,
a control apparatus including a slide assembly movably mounted on the housing between maximum air bypass, partial air bypass and minimum air bypass positions relative to the rotors and air bypass opening whereby the first portion of the mass of air moved without compression by the rotors is expelled from the internal chamber through the air bypass opening to the air bypass passage and air inlet passage of the supercharger when the slide assembly is in the maximum air bypass and partial air bypass positions and the second portion of the mass of air moved and compressed by the rotors is directed to the air intake manifold of the internal combustion engine,
a first actuator operably connected to the slide assembly to selectively move the slide assembly between maximum air bypass, partial air bypass and minimum air bypass positions to selectively increase or decrease the second portion of the mass of air directed to the intake manifold of the internal combustion engine
a throttle valve located in the air inlet passage to control the mass of air flowing into the air inlet passage and to the supercharger,
a second actuator operably connected to the throttle valve for operating the throttle valve to regulate the power of the engine,
a drive apparatus for rotating the rotors to generate the supply of the mass of air, and
a control processor responsive to power requirements of the engine to operate the first actuator to regulate the position of the slide assembly to control the second portion of the mass of air directed to the air intake manifold of the internal combustion engine.

18. The supercharged internal combustion engine of claim 17 including:
a heat exchanger connected to the air bypass passage operable to cool the first mass of air flowing to the air inlet passage and into the supercharger.

19. The supercharged internal combustion engine of claim 17 wherein:
a vent valve member for selectively allowing or preventing the first portion of the mass of air to flow to and from atmosphere, and
said second actuator being operably connected to the vent valve member to control the second vent valve member in conjunction with the throttle valve assembly for regulating the mass of air flow into the supercharger.

20. The supercharged internal combustion engine of claim 19 wherein:
the throttle valve is selectively movable between open and nearly closed positions,
the vent valve member is selectively movable to direct the first portion of the mass of air to flow to the air inlet passage of the supercharger or to atmosphere,
said second actuator comprising
a throttle actuator wired to the processor operable to selectively move the throttle valve between open and nearly closed positions to regulate the power of the internal combustion engine, and
a vent actuator wired to the processor to selectively move the vent valve member to first and second positions when the throttle valve is in its open position to allow the first portion of the mass of air to flow into the supercharger or to allow the first portion of the mass of air to flow to atmosphere when the vent valve member is in the second position.

21. The supercharged internal combustion engine and supercharger of claim 17 wherein:
the supercharger includes a housing having a pair of chambers and a channel open to the pair of chambers,
a pair of rotors located in said chambers,
an air delivery port open to the channel and in air communication with the intake manifold of the engine,
an air control slide member movably located in said channel for controlling the second portion of the mass of air released to the air delivery port, and
a third actuator connected to the air control slide member operable to move the air control slide member relative to said rotors thereby controlling the timing of the second portion of the mass of air released to the air delivery port whereby the trapped pressure of the second portion of the mass of air discharged into the air delivery port substantially equates to the pressure of the mass of air in the intake manifold of the internal combustion engine.

22. A supercharged internal combustion engine comprising:
an internal combustion engine having an air intake manifold and at least one combustion chamber for accommodating air and fuel and receiving a mass of air from the air intake manifold,
a supercharger for supplying the mass of air to the air intake manifold of the engine according to air requirements of the engine for a given power output of the internal combustion engine,
the supercharger including a housing having a chamber, an air bypass opening open to the chamber and atmosphere, and an air delivery port,
a rotor located in the chamber of the housing operable to direct a first portion of the mass of air without compression to the air bypass opening and to trap and compress a second portion of the mass of air and then direct the compressed mass of air to air delivery port and to the air intake manifold of the internal combustion engine, said supercharger including an air flow control apparatus operable to vary the compressed second portion of the mass of air supplied to the intake manifold of the internal combustion engine responsive to the air requirements of the internal combustion engine for a given power output of the internal combustion engine and direct the first portion of the mass of air without compression to the air bypass opening, said air flow control apparatus including a slide member movably mounted on the housing for movement between maximum air bypass, partial air bypass and minimum air bypass positions relative to the air bypass opening to selectively increase or decrease the first portion of the mass of air without compression flowing from the supercharger into the air bypass opening and to selectively increase or decrease the compressed second portion of the mass of air supplied to the intake manifold of the internal combustion engine, a first actuator connected to the slide member operable to selectively move the slide member between maximum bypass, partial bypass and minimum bypass positions relative to the air bypass opening, an air control slide assembly mounted on the housing operable to control the timing of the second portion of the mass of air release at the air delivery port to the air intake manifold of the internal combustion engine whereby the trapped pressure of the second portion of the mass of air discharged into the air delivery port substantially equates to the pressure of the mass of air in the intake manifold of the internal combustion engine, a second actuator operably connected to the air control slide assembly to move the air control slide assembly relative to the rotor to vary the timing of the second portion of the mass of air release at the air delivery port to the air intake manifold of the internal combustion engine, a drive apparatus for rotating the rotor to generate a supply of mass of air, an apparatus for introducing fuel into the air supplied to the combustion chamber corresponding to the second portion of the mass of air directed to the combustion chamber of the engine by the supercharger, and a control responsive to the load requirements of the engine to operate the second actuator to regulate the position of the air control slide assembly to regulate the second portion of the mass of air release at the air delivery port.

23. The supercharged internal combustion engine of claim 22 wherein:
the housing has a pair of chambers,
a rotor located in each chamber,
a channel in the housing open to said pair of chambers adjacent to the rotors,
said air control slide assembly movable located in said channel for controlling the timing of the second portion of the mass of air release at the air delivery port to the air intake manifold of the internal combustion engine.

24. The supercharged internal combustion engine of claim 22 wherein:
the control includes a processor to operate the second actuator to regulate the position of the air control slide assembly relative to the air delivery port and control the apparatus to regulate the amount of fuel introduced into the combustion chamber.

25. The supercharged internal combustion engine of claim 22 wherein:
the drive apparatus for operating the supercharger comprises a power transmission coupling the engine to the supercharger whereby the engine drives the supercharger.

26. A supercharged internal combustion engine comprising:
an internal combustion engine having an air intake manifold and at least one combustion chamber for accommodating a mass of air and fuel and receiving the mass of air from the air intake manifold,
a supercharger operable to supply the mass of air to the air intake manifold of the engine according to air requirements of the engine for a given power output of the internal combustion engine,
wherein the supercharger includes:
a housing having an internal chamber,
rotors located in the internal chamber in the housing operable to move a first portion of the mass of air without compression through the supercharger to atmosphere and to trap and compress a second portion of the mass of air and then to direct the intake manifold of the engine,
said housing including an air bypass opening open to the internal chamber and atmosphere,
a control apparatus including a slide assembly movably mounted on the housing between maximum air bypass, partial air bypass and minimum air bypass positions relative to the rotors and air bypass opening whereby the first portion of the mass of air moved without compression by the rotors is expelled from said internal chamber through the air bypass opening to an air bypass passage when the slide assembly is in the maximum air bypass and partial air bypass positions and the second portion of the mass of air is trapped and compressed by the rotors and is then directed to the air intake manifold of the internal combustion engine,
a first actuator operably connected to the slide assembly to selectively move the slide assembly between maximum air bypass, partial air bypass and minimum air bypass positions to vary the compressed second portion of the mass of air directed to the combustion chamber of the internal combustion engine thereby selectively increasing or decreasing the second portion of the mass of air flow and associated internal compression ratio of the second portion of the mass of air moved by the rotors to the air intake manifold of the internal combustion engine,
a valve assembly located between the supercharger and the air intake manifold of the engine for controlling the second portion of the mass of air flowing from the supercharger to the air intake manifold of the engine to regulate power of the engine,
a second actuator operably connected to the valve assembly for operating the valve assembly to regulate the power of the engine,
a drive apparatus for rotating the rotors to generate the supply of the mass of air,
an apparatus for introducing fuel into the mass of air supplied to the combustion chamber corresponding to the mass of air flow directed to the combustion chamber of the internal combustion engine by the supercharger, and
a control processor responsive to power requirements of the engine to operate the first actuator to regulate the position of the slide assembly to control the second portion of the mass of air directed to the air intake manifold of the engine to control the second actuator and to control the apparatus to regulate an amount of fuel introduced into the combustion chamber of the internal combustion engine.

27. The supercharged internal combustion engine of claim 26 wherein:
the rotors comprise a male screw rotor and a female screw rotor and
said air bypass opening being open to a side portion of the male screw rotor.

28. The supercharged internal combustion engine of claim 26 including:
an air delivery port open to the internal chamber and in air communication with the air intake manifold of the engine, and
a second air control slide assembly operable to change the timing of the second portion of the mass of the air released to the air delivery port whereby the trapped pressure of the second portion of the mass of air discharged into the air delivery port substantially equates to the pressure of the mass of air in the intake manifold of the internal combustion engine.

29. The supercharged internal combustion engine and supercharger of claim 26 wherein:
the housing has a channel open to said internal chamber,
an air delivery port open to the channel and in air communication with the air intake manifold of the engine,
a second air control slide assembly movably located in said channel for controlling the timing of compressed mass of the air released to the air delivery port, and
a third actuator operably connected to the second air control slide assembly to move the second air control slide assembly in the channel relative to the rotors, said third actuator being coupled to the processor whereby command signals from the processor controls the operation of the third actuator whereby the trapped pressure of the second portion of the mass of air discharged into the air delivery port substantially equates to the pressure of the mass of air in the intake manifold of the internal combustion engine.

30. The supercharged internal combustion engine of claim 29 wherein:
the rotors comprise a male screw rotor and a female screw rotor.

31. The supercharged internal combustion engine of claim 26 including:
a device operable to deliver a mass air flow signal of the air flowing from the supercharger to the air intake manifold of the internal combustion engine, said mass air flow signal being directed to the processor which controls the apparatus to regulate the amount of fuel injected into the combustion chamber of the internal combustion engine to maintain a desired combustible air/fuel ratio in the combustion chamber of the internal combustion engine.

32. The supercharged internal combustion engine of claim 26 including:
a vent valve member located between the supercharger and the throttle valve assembly selectively movable between open and closed positions for venting a mass of air of the second portion of the mass of air to atmosphere when the second valve member is open,
said second actuator being operably connected to the vent valve member to control the vent valve member in conjunction with the throttle valve member for controlling the second portion of the mass of air flowing to the air intake manifold of the internal combustion engine.

33. The supercharged internal combustion engine of claim 32 wherein:
said second actuator comprising
a throttle actuator wired to the processor operable to selectively move the throttle valve assembly between open and nearly closed positions to regulate the power of the internal combustion engine, and
a vent actuator wired to the processor to move the second vent valve member to the closed position when the throttle valve assembly is in its open position to allow the second portion of the mass of air to flow into the air intake manifold of the internal combustion engine.

34. The supercharged internal combustion engine of claim 26 wherein:
the second actuator includes a manual control for operating the throttle valve assembly to vary the power of the internal combustion engine.

35. A supercharged internal combustion engine comprising:
an internal combustion engine having an air intake manifold for accommodating a mass of air and at least one combustion chamber in communication with the air intake manifold,
a supercharger for supplying the mass of air to the air intake manifold of the internal combustion engine,
wherein said supercharger has:
a housing with an air bypass opening, and
a drive apparatus for operating the supercharger to supply the mass of air to the air intake manifold of the internal combustion engine,
a throttle valve assembly located between the supercharger and air intake manifold of the internal combustion engine movable between open and nearly closed positions for controlling the mass of air flowing from the supercharger to the air intake manifold to regulate the power of the internal combustion engine,
a vent valve assembly located between the supercharger and throttle valve assembly selectively movable between open and closed positions for allowing the mass of air from the supercharger to flow to and from atmosphere or preventing the mass of air from the supercharger to flow to atmosphere,
a control operably connected to the throttle and vent valve assemblies to move the throttle valve assembly to control the mass of air flowing to the air intake manifold to regulate the power of the internal combustion engine and move the vent valve assembly from the open position to the closed position when the throttle valve assembly is in the open position,
a first sensor providing a first signal representative of the position of the throttle valve assembly between and including its open and nearly closed positions,
a second sensor providing a second signal representative of the position of the vent valve assembly in its open position or nearly closed position,
said supercharger including an air flow control apparatus operable to regulate the mass of air supplied to the air intake manifold of the internal combustion engine responsive to air requirements of the internal combustion engine for a given power output of the internal combustion engine,
said air flow control apparatus including a slide member movably mounted on the housing for movement between maximum air bypass, partial bypass and minimum air bypass positions relative to the air bypass opening to selectively increase or decrease a first portion of the mass of air without compression flowing from the supercharger into the air bypass opening and to selectively increase or decrease a second portion of the mass of air supplied to the intake manifold of the internal combustion engine, an actuator connected to the slide member operable to selectively move the slide member between maximum bypass, partial bypass and minimum bypass positions relative to the air bypass opening, an apparatus for introducing fuel into the air in the combustion chamber of the internal combustion engine corresponding to the mass of air delivered to the air intake manifold of the internal combustion engine by the supercharger, and a processor being responsive to the first and second signals from the first and second sensors to provide command signals to control the apparatus to regulate an amount of fuel introduced into the mass of air supplied to the engine during transient engine operation and responsive to said mass of the air flow into the air intake manifold and to control the apparatus for maintaining a desired combustible air/fuel ratio in the combustion chamber of the internal combustion engine.

36. The supercharged internal combustion engine of claim 35 wherein:
the control comprises a manual operated member and linkages connecting the member to the first and second valve assemblies,
said manual operated member being movable to control the operations of the throttle and vent valve assemblies.

37. The supercharged internal combustion engine of claim 35 wherein:
the supercharger includes a housing having a pair of chambers, said air bypass opening open to one of the chambers and atmosphere, and a pair of rotors located in the chambers in the housing.

38. The supercharged internal combustion engine of claim 35 wherein:
the supercharger includes a housing having generally parallel chambers,
rotors located in chambers in the housing operable to move air through the supercharger and air bypass opening,
said housing including the air bypass opening open to one of the chambers and atmosphere,
said slide member being movably mounted on the housing between maximum air bypass, partially air bypass and minimum air bypass positions relative to the rotors and air bypass opening whereby a second portion of the mass of air is trapped and compressed by the rotors and then is directed to the air intake manifold of the internal combustion engine and a first portion of the mass of air moved without compression by the rotors is expelled from said one of the chambers to atmosphere through the air bypass opening when the slide member is in the maximum air bypass and partially air bypass positions,
an actuator operably connected to the slide assembly to selectively move the slide assembly between maximum air bypass, partially air bypass and minimum air bypass positions to vary the amount of the second portion of air directed to the air intake manifold of the internal combustion engine,
a third sensor for providing signals representative of the power requirements of the engine,
said processor also being responsive to the signals from the third sensor to provide command signals for operating the actuator.

39. A supercharged internal combustion engine comprising:
an internal combustion engine having an air intake manifold and at least one combustion chamber for receiving a mass of air from the air intake manifold,
a supercharger operable for supplying the mass of air to the air intake manifold of the engine,
wherein said supercharger includes:
a housing having an internal chamber,
an air bypass opening to the internal chamber, and
an air bypass passage open to the air bypass opening,
a pair of rotors rotatably mounted on the housing located in the chamber operable to move a first portion of the mass of air without compression through the air bypass opening to the air bypass passage, and to move a compressed second portion of the mass of air to the air intake manifold of the internal combustion engine,
an air flow control apparatus operable to vary the second portion of the mass of air at air pressures in the range of atmospheric air pressure to three atmospheric air pressures of the second portion of the mass of air supplied to the intake manifold of the internal combustion engine responsive to air requirements of the internal combustion engine for a given power output of the internal combustion engine,
said air flow control apparatus including a slide assembly movably mounted on the housing and located between the chamber and air bypass opening movable between maximum air bypass, partial air bypass and minimum air bypass positions relative to the rotors and the air bypass opening whereby the first portion of the mass of air moved by the rotors when the slide assembly is in the maximum air bypass and partial air bypass positions is directed to the air bypass passage without compression and the second portion of the mass of air is trapped and compressed by the rotors and is then directed to the air intake manifold of the internal combustion engine,
a first actuator operably connected to the slide assembly to selectively move the slide assembly between maximum air bypass, partial air bypass and minimum air bypass positions to vary the second portion of the trapped mass of air that is compressed and directed to the air intake manifold of the engine thereby selectively increasing or decreasing the mass of air flow and associated internal compression ratio of the mass of air moved by the rotors to the combustion chamber of the engine,
a power transmission drivably connecting the engine to the rotors to rotate the rotors to generate the supply of the mass of air,
a throttle valve assembly located between the supercharger and air intake manifold of the engine for controlling the mass of air flow at air pressures in the range of one half atmospheric air pressure to three atmospheric air pressures to the air intake manifold of the engine to regulate the power of the engine,
a second actuator operably connected to the throttle valve assembly for operation of the throttle valve assembly to vary the air requirements of the internal combustion engine for a given power requirement of the internal combustion engine,
wherein the second actuator includes a progressive sequential manual control for operating the throttle valve assembly to vary a power of the engine,
an apparatus for introducing fuel into the mass of air in the combustion chamber of the engine corresponding to the second portion of the mass of air delivered to the combustion chamber of the engine by the supercharger, at least one sensor for providing a signal representative of the power requirement of the engine, and a control processor responsive to the signal from the at least one sensor for providing the signal representative of the power requirement of the engine to operate the first and second actuators and to regulate the fuel introduced into the combustion chamber of the internal combustion engine.

40. The supercharged internal combustion engine of claim 39 wherein:

said housing includes an air delivery port open to the internal chamber of the housing and in air communication with the air intake manifold of the internal combustion engine, a second air control slide assembly operable to control the second portion of the mass of air released into the air delivery port, and a third actuator operably connected to the second air control slide assembly to move the second air control slide assembly relative to the rotors.

41. The supercharged internal combustion engine claim 39 including:

a vent valve member located between the supercharger and throttle valve assembly for directing air to atmosphere, and said second actuator being operably connected to the vent valve member to control the vent valve member in conjunction with the throttle valve assembly for regulating the mass of air flow to the air intake manifold of the internal combustion engine.

42. A supercharged internal combustion engine comprising:

an internal combustion engine having an air intake manifold and at least one combustion chamber for receiving a mass of air from the air intake manifold, a supercharger being operable for supplying the mass of air to the air intake manifold of the internal combustion engine wherein the supercharger includes:

a housing having a pair of chambers, an air bypass opening open to at least one of the chambers and an air bypass passage, a pair of rotatable rotors located in the chambers operable to generate a mass flow of air and move a first portion of the mass of air without compression through the housing to the air bypass opening to the air bypass passage and to move a compressed second portion of the mass of air to the air intake manifold of the internal combustion engine, an air flow control apparatus operable to vary the second portion of the mass of air flow at air pressures in the range of atmospheric air pressure to three atmospheric air pressures of the mass of the air supplied to the air intake manifold of the internal combustion engine responsive to air requirements of the internal combustion engine for a given power output of the internal combustion engine, said air flow control apparatus including a slide assembly movably mounted on the housing for movement between maximum air bypass, partial air bypass and minimum air bypass positions relative to the rotors and said air bypass opening whereby the first portion of the mass of air moved by the rotors when the slide assembly is in the maximum air bypass and partial air bypass positions is directed to the air bypass passage without compression and the second portion of the mass of air trapped and compressed by the rotors and is then directed to the air intake manifold of the internal combustion engine, a first actuator operably connected to the slide assembly to selectively move the slide assembly between maximum air bypass, partial air bypass and minimum air bypass positions to vary the second portion of the trapped mass of air that is compressed and directed to the air intake manifold of the internal combustion engine, thereby selectively increasing or decreasing the mass of air flow and associated internal compression ratio of the mass of air moved by the rotors to the combustion chamber of the internal combustion engine, a power transmission drivably connecting the internal combustion engine to the rotors to rotate the rotors whereby the internal combustion engine operates the supercharger to generate a supply of the mass of air, a throttle valve assembly located between the supercharger and air intake manifold of the internal combustion engine for controlling the mass of air flow at air pressures in the range of one half atmospheric air pressure to three atmospheric air pressures to the air intake manifold of the engine to regulate a power of the internal combustion engine, a second actuator operably connected to the throttle valve assembly for operation of the throttle valve assembly to regulate the air requirements of the internal combustion engine for a given power requirement of the internal combustion engine, an apparatus for introducing fuel into the mass of air in the combustion chamber of the internal combustion engine corresponding to the second portion of the mass of air delivered to the combustion chamber of the internal combustion engine by the supercharger, at least one sensor for providing a signal representative of the power requirement of the internal combustion engine, and a control processor responsive to the signals from the at least one sensor for providing the signal representative of the power requirement of the engine to operate the first and second actuators second actuator, said control processor being operable to control the apparatus to regulate the of fuel introduced into the combustion chamber of the internal combustion engine.

43. The supercharged internal combustion engine of claim 42 wherein:

the rotors comprise a male screw rotor and a female screw rotor and said air bypass opening being open to a side portion of the male screw rotor.

44. The supercharged internal combustion engine of claim 42 wherein:

said housing includes an air delivery port open to the chambers and in air communication with air intake manifold of the internal combustion engine, and a second air control slide assembly operable to control the air released into the air delivery port whereby the trapped pressure of the second portion of the mass of air discharged into the air delivery port substantially equates to the pressure of the mass of air in the intake manifold of the internal combustion engine.

45. The supercharged internal combustion engine a of claim 42 wherein:

the housing has a pair of chambers, said rotors being located in said chambers, a channel in the housing open to said pair of chambers, an air delivery port open to the chambers and in air communication with the air intake manifold of the internal combustion engine, a second air control slide assembly movably located in said channel for controlling the timing of the air released into the air delivery port whereby the trapped pressure of the second portion of the mass of air discharged into the air delivery port substantially equates to the pressure of the mass of air in the intake manifold of the internal combustion engine, and a third actuator operably connected to the second air control slide assembly to move the second air control slide assembly relative to the rotors, said third actuator being coupled to the processor whereby command signals from the processor controls the operation of the third actuator.

46. The supercharged internal combustion engine of claim 45 wherein:

the rotors comprise a male screw rotor and a female screw rotor.

47. The supercharged internal combustion engine of claim 42 including:

an apparatus for cooling the compressed mass of the air as it flows between the supercharger and the air intake manifold of the internal combustion engine.

48. The supercharged internal combustion engine of claim 42 including:

a device operable to deliver a mass air flow signal of the air flowing from the supercharger to the air intake manifold of the internal combustion engine, said mass air flow signal being directed to the processor which controls the apparatus to regulate the amount of fuel injected into the combustion chamber of the internal combustion engine to maintain a desired combustible air/fuel ratio in the combustion chamber of the internal combustion engine.

49. The supercharged internal combustion engine of claim 42 including:

a vent valve member located between the supercharger and throttle valve assembly for selectively allowing or limiting the second portion of the mass of air to flow to atmosphere, and said second actuator being operably connected to the vent valve member to control the vent valve member in conjunction with the throttle valve assembly for selectively regulating the second portion of the mass of air flow to the air intake manifold of the internal combustion engine or to or from atmosphere.

50. The supercharged internal combustion engine of claim 49 wherein:

the throttle valve assembly is selectively movable between open and nearly closed positions, the vent valve member is selectively movable to an open position and a closed position, said first actuator comprising a throttle actuator wired to the processor operable to selectively move the throttle valve assembly between open and nearly closed positions to regulate the air requirements of the internal combustion engine for a given power requirement of the internal combustion engine, and a vent actuator wired to the processor to move the vent valve member to the closed position when the throttle valve assembly is in its open position to allow the second portion of the mass of air to flow into the air intake manifold of the internal combustion engine.

\* \* \* \* \*